(12) United States Patent
Pitt et al.

(10) Patent No.: US 9,965,810 B1
(45) Date of Patent: May 8, 2018

(54) IMPORTING ACCOUNTING APPLICATION DATA INTO A TAX PREPARATION APPLICATION

(71) Applicant: Intuit Inc., Mountain View, CA (US)

(72) Inventors: Elizabeth J. Pitt, El Cajon, CA (US); Steven M. Anderson, San Diego, CA (US); Sheri C. Dombrow, Santee, CA (US); Patricia D. Hansen, San Diego, CA (US)

(73) Assignee: INTUIT INC., Mountain View, CA (US)

( * ) Notice: Subject to any disclaimer, the term of this patent is extended or adjusted under 35 U.S.C. 154(b) by 0 days. days.

(21) Appl. No.: 14/077,100

(22) Filed: Nov. 11, 2013

Related U.S. Application Data

(63) Continuation of application No. 12/334,365, filed on Dec. 12, 2008, now Pat. No. 8,583,516.

(51) Int. Cl.
*G06Q 40/00* (2012.01)

(52) U.S. Cl.
CPC .................................. *G06Q 40/123* (2013.12)

(58) Field of Classification Search
CPC ...... G06Q 10/10; G06Q 40/103; G06Q 40/02; G06Q 40/00; G06F 17/30286; G06F 17/22
USPC ...................... 705/31, 32; 707/802
See application file for complete search history.

(56) References Cited

U.S. PATENT DOCUMENTS

| | | | |
|---|---|---|---|
| 6,347,304 B1 * | 2/2002 | Taricani, Jr. ............. | 705/19 |
| 7,234,103 B1 * | 6/2007 | Regan .................... | 715/234 |
| 7,392,210 B1 * | 6/2008 | MacKay et al. ........ | 705/35 |
| 7,603,301 B1 * | 10/2009 | Regan .................... | 705/31 |
| 7,680,708 B1 * | 3/2010 | Mooney et al. ........ | 705/31 |
| 7,747,938 B2 | 6/2010 | Elkady | |
| 7,778,895 B1 * | 8/2010 | Baxter .................. | G06Q 40/00 705/30 |
| 7,899,679 B2 * | 3/2011 | MacKay et al. ........ | 705/7.27 |
| 7,899,757 B1 * | 3/2011 | Talan .................... | G06Q 40/02 705/30 |
| 8,190,499 B1 * | 5/2012 | McVickar ............. | G06Q 40/10 705/31 |
| 8,346,635 B1 * | 1/2013 | Olim ..................... | G06Q 40/10 705/30 |
| 8,359,239 B1 * | 1/2013 | Cook et al. ............ | 705/19 |

(Continued)

OTHER PUBLICATIONS

Office Action dated Aug. 23, 2011 in U.S. Appl. No. 12/334,365, filed Dec. 12, 2008, (10 pages).

(Continued)

*Primary Examiner* — Oluseye Iwarere
(74) *Attorney, Agent, or Firm* — Vista IP Law Group LLP

(57) ABSTRACT

Automatically mapping and importing accounting application data into to a tax preparation application. Account data including an account name is received from an accounting application. A tax category corresponding to the account name is determined automatically, and a tax line assignment or line of a form of the tax preparation application is automatically assigned to the account name such that the corresponding account data can be mapped to and imported into the appropriate section of a tax return. For this purpose, a table or spreadsheet of search terms may be used to correlate an account name selected by a user to a tax category, which is used to determine the appropriate tax line assignment or line of a tax form for that particular account.

31 Claims, 29 Drawing Sheets

(56) References Cited

U.S. PATENT DOCUMENTS

| | | | |
|---|---|---|---|
| 8,583,516 B1* | 11/2013 | Pitt | G06F 17/243 |
| | | | 705/31 |
| 2002/0023055 A1* | 2/2002 | Antognini | G06K 1/121 |
| | | | 705/40 |
| 2002/0082961 A1* | 6/2002 | Abrahm et al. | 705/35 |
| 2002/0091602 A1* | 7/2002 | Stern | G06Q 40/00 |
| | | | 705/35 |
| 2002/0111888 A1* | 8/2002 | Stanley | G06Q 40/02 |
| | | | 705/31 |
| 2002/0133410 A1 | 9/2002 | Hermreck et al. | |
| 2003/0055754 A1 | 3/2003 | Sullivan | |
| 2003/0061132 A1* | 3/2003 | Yu et al. | 705/30 |
| 2003/0101114 A1* | 5/2003 | Delapass | G06Q 10/0637 |
| | | | 705/31 |
| 2003/0167216 A1* | 9/2003 | Brown et al. | 705/30 |
| 2004/0030619 A1* | 2/2004 | Stokes et al. | 705/31 |
| 2004/0167835 A1* | 8/2004 | Yaur | G06F 19/328 |
| | | | 705/31 |
| 2005/0131725 A1 | 6/2005 | Sleeper et al. | |
| 2005/0131805 A1 | 6/2005 | Bross | |
| 2005/0246234 A1 | 11/2005 | Munyon | |
| 2005/0251733 A1 | 11/2005 | Elkady | |
| 2006/0015419 A1 | 1/2006 | Graf et al. | |
| 2006/0026083 A1* | 2/2006 | Wyle | G06F 17/243 |
| | | | 705/31 |
| 2006/0155618 A1 | 7/2006 | Wyle | |
| 2006/0178961 A1 | 8/2006 | Stanley et al. | |
| 2006/0282354 A1 | 12/2006 | Varghese | |
| 2007/0124328 A1 | 5/2007 | Klein | |
| 2007/0208606 A1* | 9/2007 | MacKay et al. | 705/9 |
| 2008/0071703 A1* | 3/2008 | Evans | G06Q 10/10 |
| | | | 705/36 T |
| 2008/0147494 A1* | 6/2008 | Larson | G06Q 30/0234 |
| | | | 705/14.34 |
| 2008/0147528 A1 | 6/2008 | Talan et al. | |
| 2009/0132399 A1* | 5/2009 | Pavlou | G06Q 40/123 |
| | | | 705/31 |
| 2010/0153138 A1* | 6/2010 | Evans | G06Q 10/10 |
| | | | 705/4 |
| 2011/0022502 A1* | 1/2011 | Evans | G06Q 10/10 |
| | | | 705/31 |

OTHER PUBLICATIONS

Interview Summary dated Nov. 21, 2011 in U.S. Appl. No. 12/334,365, filed Dec. 12, 2008, (4 pages).

Amendment as filed Nov. 23, 2011 in U.S. Appl. No. 12/334,365, filed Dec. 12, 2008, (7 pages).

Final Office Action dated Feb. 29, 2012 in U.S. Appl. No. 12/334,365, filed Dec. 12, 2008, (13 pages).

Amendment as filed May 17, 2012 in U.S. Appl. No. 12/334,365, filed Dec. 12, 2008, (12 pages).

Office Action dated Sep. 20, 2012 in U.S. Appl. No. 12/334,365, filed Dec. 12, 2008, (20 pages).

Amendment as filed Jan. 30, 2013 in U.S. Appl. No. 12/334,365, filed Dec. 12, 2008, (15 pages).

Final Office Action dated Apr. 10, 2013 in U.S. Appl. No. 12/334,365, filed Dec. 12, 2008, (23 pages).

Amendment as filed Apr. 30, 2013 in U.S. Appl. No. 12/334,365, filed Dec. 12, 2008, (10 pages).

Notice of Allowance dated May 17, 2013 in U.S. Appl. No. 12/334,365, filed Dec. 12, 2008, (9 pages).

* cited by examiner

| Account Name Search Terms and Synonyms | Account Type | Tax Category | TLA |
|---|---|---|---|
| ST1, ST2, ST3 | AT1 | TC1 | TLA-1 |
| ST4, ST5, ST6 | AT1 | TC2 | TLA-2 |
| ST7, ST8 | AT1 | TC3 | TLA-3 |
| ST9, ST10, ST11, ST12, ST13 | AT2 | TC4 | TLA-4 |
| ST14 | AT3 | TC5 | TLA-5 |
| ST15, ST16 | AT1 | TC6 | TLA-6 |
| ST17 | AT4 | TC7 | TLA-7 |
| ST18, ST19, ST20 | AT2 | TC8 | TLA-8 |
| ST21, ST22 | AT1 | TC9 | TLA-9 |
| STn | ATn | TCn | TLA-n |

| Account Name Search Terms and Synonyms | Account Type | Tax Category | TLA-C | TLA-S | TLA-LLP |
|---|---|---|---|---|---|
| ST1, ST2, ST3 | AT1 | TC1 | TLA-C1 | TLA-S1 | TLA-LLP1 |
| ST4, ST5, ST6 | AT1 | TC2 | TLA-C2 | TLA-S2 | TLA-LLP2 |
| ST7, ST8 | AT1 | TC3 | TLA-C3 | TLA-S3 | TLA-LLP3 |
| ST9, ST10, ST11, ST12, ST13 | AT2 | TC4 | TLA-C4 | TLA-S4 | TLA-LLP4 |
| ST14 | AT3 | TC5 | TLA-C5 | TLA-S5 | TLA-LLP5 |
| ST15, ST16 | AT1 | TC6 | TLA-C6 | TLA-S6 | TLA-LLP6 |
| ST17 | AT4 | TC7 | TLA-C7 | TLA-S7 | TLA-LLP7 |
| ST18, ST19, ST20 | AT2 | TC8 | TLA-C8 | TLA-S8 | TLA-LLP8 |
| ST21, ST22 | AT1 | TC9 | TLA-C9 | TLA-S9 | TLA-LLP9 |
| STn | ATn | TCn | TLA-Cn | TLA-Sn | TLA-LLPn |

| Account Name Search Terms and Synonyms | Acct Type | Tax Category | TLA-S Corp | TLA-C Corp | TLA-LLP |
|---|---|---|---|---|---|
| Dividend Income; Div Inc; Dividend; Div | type_inc | Dividend Income | 1037 | 1499 | 1811 |

| 610a Account Name Search Terms and Synonyms | 610b Acct Type | 610c Tax Category | 610d₁ TLA-S Corp | 610d₂ TLA-C Corp | 610d₃ TLA-LLP |
|---|---|---|---|---|---|
| Sales; Income; Receipts; Fees; Parts; Services; Revenue; Maintenance; Sales Discounts; Commissions; Commissions Income; Commission Income; Fee Income; Sales Materials; Service; Discounts; Merchandise | type_inc | Sales | 1003 | 1259 | 1617 |
| Interest Income; Int Inc; Interest; Int | type_inc | State Tax Refund | 3239 | -1 | -1 |
| Dividend Income; Div Inc; Dividend Div | type_inc | Interest Income | 1007 | 1497 | 1809 |
| Rental Income; Rent; Rent Inc | type_inc | Dividend Income | 1037 | 1499 | 1811 |
| State Tax Refund; State Income Tax Refund; Income Tax; State Tax | type_inc | Rental Income | 1039 | 1269 | 1629 |
| Returns and Allowances; Returns; Made returned; Merchandise Returned; Refunds and Allowances; Refunds | type_inc | Returns and Allowances | 1065 | 1261 | 1619 |
| Other Income; Miscellaneous Inc; Miscellaneous Income | type_inc | Other Income | 1017 | 1269 | 1629 |
| Purchase Costs; Purchases; Raw Materials; Manufacturing Supplies; Materials; Supplies; Sales Materials; Cost of Goods Sold; Costs of Goods Sold | type_cogs | Purchase Costs | 1059 | 1275 | 1634 |
| Cost of Labor; Manufacturing Wages; Mfg wages; Labor; Subcontractors; Payroll Taxes; Workers Compensation Insurance; Worker's Comp Insurance; Workers Comp; Worker's Comp; Workmans Compensation; Workman's Compensation | type_cogs | Cost of Labor | 1061 | 1277 | 1636 |
| Other COGS; Vehicles; Permits; Tools; Fees; Equipment Rental; Merchant Account Fees; Tools and Small Equipment; Small Tools; Contractors; Independent Contractors; Freight; Freight and Delivery; Freight & Delivery; Delivery | type_cogs | Other COGS | 1075 | 1295 | 1658 |
| Accounting; Bookkeeping; Bookkeeper; CPA; Accountant Fees; Accountant; Account Fees; Accounting Fees; Accounting Charges; Accounting Expense | type_exp | Accounting | 3201 | 3001 | 3101 |

FIG. 9A

| 610a | 610b | 610c | 610d₁ | 610d₂ | 610d₃ |
|---|---|---|---|---|---|
| Account Name Search Terms and Synonyms | Acct Type | Tax Category | TLA-S Corp | TLA-C Corp | TLA-LLP |
| Advertising; Promotions; Adv Exp; Marketing; Conventions; Displays; Sign Posts; Newspaper; Phone Book; Phonebook; Adv; Radio; TV; Decal; Decals; Decaling; Decaling; Decaled; Direct Mail; Door Hangers; Advertising and Promotion; Advertising & Promotion; Advertising Expense; Marketing Expense; Promotions Expense; Marketing Expenses; Promotion Expense; Trade Shows; Marketing/Trade Shows | type_exp | Advertising | 1105 | 1321 | 3122 |
| Auto and Truck Expenses; Auto; Automobile; Fuel; Gas; Car Registration; Vehicle; Oil; Tires; Mileage; Auto Insurance; Automobile Expense; Automobile Payment; Auto Expenses; Vehicle Maintenance; Vehicle Fuel; Gas and Oil; Gas & Oil; Auto Repairs and Maintenance; Auto Repairs; Auto Repairs & Maintenance; Auto Maintenance; Vehicle Repair; Car and Truck Expense; Car and Truck Expense; Car/Truck Expense; Car/Truck; Car & Truck Expense; Car and Truck Exp; Car & Truck; Truck/Fuel; Car-Fuel; Car-Gas; Truck-Gas; Gas-Car; Gas-Truck; Gas-Vehicle; Mileage Reimbursement; Miles | type_exp | Auto and Truck Expenses | 3202 | 3202 | 3102 |
| Bad Debt; Uncollectibles; Stiffs; Not Collected | type_exp | Bad Debt | 1087 | 1327 | 1070 |
| Bank Charges; Bank; Bank Chg; Bank Chgs; Service Fees; Bank Fees; Credit Card Fees; Bank Service Charges; Merchant Fees; Charge Card Fees; Late Fees; Credit Card Service Fees; CC Charges; Credit Card Merchant Fees; Merchant Service | type_exp | Bank Charges | 3203 | 3003 | 3103 |
| Business Gifts; Gifts; Promotions & Gifts; Promotions & Gifts; Gifts & Promotions; Gifts and Promotions; Promotion | type_exp | Business Gifts | 3204 | 3004 | 3104 |
| Charitable Contributions; Charity; Contributions; Donations; Political Contributions; Political; Charitable | type_exp | Charitable Contributions | 1101 | 1510 | 1820 |
| Commissions; Commissions and Fees; Commissions & Fees; Sales Commission; Commission | type_exp | Commissions | 3205 | 3005 | 3105 |
| Continuing & Professional Education; Continuing Education; Training; Education; Prof Development; Professional Development; Training Expense; Conference; Seminar; Seminars | type_exp | Continuing & Professional Education | 3220 | 3030 | 3130 |

FIG. 9B

| Account Name Search Terms and Synonyms | Acct Type | Tax Category | TLA-S Corp | TLA-C Corp | TLA-LLP |
|---|---|---|---|---|---|
| Credit & Collection Costs; Credit and Collection Costs; Debt Collection | type_exp | Credit & Collection Costs | 3231 | 3031 | 3131 |
| Depreciation; Deprec; Deprec.; Depr.; Depr Depreciation Expense; Deprec Expense; Depr Expense; Amortization; Amort; Amortization Expense; Amort | type_exp | Depreciation | -1 | -1 | -1 |
| Discounts; Sales Discounts; Discounts Given | type_exp | Discounts | 3208 | 3008 | 3108 |
| Draws; Partner Draws; Shareholder Draws; Withdrawals; Withdraws; Officer Draws | type_exp | Draws | -1 | -1 | -1 |
| Dues & Subscriptions; Dues and Subscriptions; Dues and Subs; Memberships; Magazines; Magazines and Periodicals; Magazines & Periodicals; Business Publications; Trade Publications; Dues; Subscriptions | type_exp | Dues & Subscriptions | 3207 | 3007 | 3107 |
| Employee Benefits; Empl Benef | type_exp | Employee Benefits | 1100 | 1025 | 1000 |
| Guaranteed Payments - Medical Insurance; Medical; Partner Medical; Partner Medical Insurance; Partner Insurance | type_exp | Guaranteed Payments - Medical Insurance | -1 | -1 | 1007 |
| Guaranteed Payments - Partners; Guaranteed Payments; Payments to Partner; Payments to Partners; Partner | type_exp | Guaranteed Payments - Partners | -1 | -1 | 1006 |
| Guaranteed Payments - Use of Capital | type_exp | Guaranteed Payments - Use of Capital | -1 | -1 | 1005 |
| Independent Contractors; IC's; Contract Labor; Outside Services; O/S; Consultants; Contractors; Outside Consultants; Consulting; Subcontractors; Consulting Fees; Temporary Help; Temps | type_exp | Independent Contractors | 3208 | 3008 | 3108 |
| Insurance; Other Insurance; Insurance; Insurance-Other; Surety Bond; Insurance Expense; General Liability Insurance; Liability Insurance; E/O Insurance; E&O Insurance; Malpractice Insurance | type_exp | Insurance | 3209 | 3009 | 3109 |
| Disability Insurance; Disability Insurance Expense; Disability; Insurance - Disability; Insurance Disability | type_exp | Insurance - Disability | 1109 | 3033 | 3134 |

FIG. 9C

| 610a<br>Account Name Search Terms and Synonyms | 610b<br>Acct Type | 610c<br>Tax Category | 610d₁<br>TLA-S Corp | 610d₂<br>TLA-C Corp | 610d₃<br>TLA-LLP |
|---|---|---|---|---|---|
| Insurance - Life; Insurance-Life; Life Insurance; Life; Life Ins; Life Insurance Expense; Insurance Life | type_exp | Insurance - Life | 1103 | 3009 | 3109 |
| Insurance - Medical; Insurance-Medical; Medical Insurance; Medical Insurance Expense; Health Insurance; Health Insurance Expense; Health; Insurance - Health; Insurance-Health; Insurance Health | type_exp | Insurance - Medical | 1109 | 3033 | 3133 |
| Insurance - Shareholder Disability; Shareholder Disability Insurance; S/H Disability Ins; Shareholder DI; S/H DI | type_exp | Insurance - Shareholder Disability | -1 | 3024 | -1 |
| Insurance - Shareholder Life; Shareholder Life Insurance; S/H Life | type_exp | Insurance - Shareholder Life | -1 | 3023 | -1 |
| Insurance - Shareholder Medical; Shareholder Medical Insurance; S/H Medical; S/H Health Ins; Shareholder Dental Insurance; S/H Dental; S/H Dental Ins; S/H Health Ins; S/H Dental Ins. | type_exp | Insurance - Shareholder Medical | -1 | 3022 | -1 |
| Interest Expense; Other Interest; Other Int; Finance Charges; Interest Exp; Fin Chg Interest; Interest Charges; Other Int. Interest Exp., Fin Chg | type_exp | Interest Expense | 1009 | 1310 | 1002 |
| Janitorial & Cleaning; Janitorial and Cleaning; Cleaning & Janitorial; Cleaning and Janitorial; Janitorial; Cleaning; Window Cleaning; Cleaning Expense; Commercial Cleaning; Janitorial Expense; Janitorial Exp; Janitorial Exp.; Cleaning Exp; Cleaning Exp. | type_exp | Janitorial & Cleaning | 3236 | 3036 | 3136 |
| Legal & Professional; Professional & Legal; Legal and Professional; Professional and Legal; Legal & Prof; Lawyer; Attorney; Professional Fees; Legal; Professional; Legal Fees; Research Services; Legal and Prof.; Payroll Services; Professional Legal | type_exp | Legal & Professional | 3211 | 3011 | 3111 |
| Licenses & Permits; Licenses and Permits; Lic. and Perm; Lic & Perm; Lic. and Perm; License and Permit; License and Permits; Licenses; Fees; Business Permit; Business Permits; City License; Permits; Business Licenses and Permits; Business License & Permit; Business License; Licenses; Permits and Fees | type_exp | Licenses & Permits | 1008 | 1316 | 1001 |

FIG. 9D

| 610a | 610b | 610c | 610d₁ | 610d₂ | 610d₃ |
|---|---|---|---|---|---|
| Account Name Search Terms and Synonyms | Acct Type | Tax Category | TLA-S Corp | TLA-C Corp | TLA-LLP |
| 100%_Deduction | type_exp | Meals & Ent - Company Party | 3225 | 3025 | 3123 |
| Meals & Entertainment - 50%; Meals & Entertainment-50%; Meals and Entertainment - 50%; Meals and Entertainment-50%; M&E 50%; Lunch; Lunches; Meals Out of Town; Out of Town Meals; Catering; Meals; Entertainment Ent. 50% Deduction | type_exp | Meals & Entertainment | 1153 | 1303 | 1735 |
| Office Expenses; Office Supplies; Supplies; Drinking Water; Grocery; Bottled Water; Supplies; Software; Computer Expenses; Laptop; Office Expense; Printer Ink and Toner; Ink & Toner; Printer Ink and Toner; Printer Ink & Toner; Post Office Box; Administration Expenses; Admin Expenses; Admin Costs; Admin; Administrative Services; Warehousing Fees | type_exp | Office Expenses | 3212 | 3012 | 3112 |
| Parking Fees & Tolls; Parking; Parking Fees; Tolls; Parking Fees and Tolls; Parking Expense | type_exp | Parking Fees & Tolls | 3213 | 3013 | 3113 |
| Payroll - Officers/Shareholders; Payroll - Officers; Officer Compensation; Officer Salaries; P/R Officers; Officer; Officer Salary; Salaries - Officers; Officer Wages; Wages - Officer; Payroll - Shareholder > 2%; S/H Payroll; S/H P/R; Shareholder Salary; Shareholder Wages; S/H Wages | type_exp | Payroll - Officers/Shareholders | 1080 | 1301 | -1 |
| Payroll - Other Employees; Payroll - Employees; Payroll-Employees; Wages; Empl Salaries; Payroll Expenses; Salaries; Employees; Payroll Salary; Salaries and Wages; Salaries & Wages; Wages and Salaries; Wages & Salaries | type_exp | Payroll - Other Employees | 1085 | 1303 | 1664 |
| Postage & Delivery; FedEx; DHL; Shipping; Postage; Delivery; Postage and Delivery; UPS; Postage Expense; Delivery Expense; Messenger; Delivery & Freight; Delivery and Freight; Freight; Freight Expense | type_exp | Postage & Delivery | 3214 | 3014 | 3114 |
| Printing & Copying; Printing and Copying; Printing & Reproduction; Printing and Reproduction; Copying; Xerox Copies; Printing; Faxing; Fax; Facsimile; Faxes | type_exp | Printing & Copying | 3215 | 3015 | 3115 |

FIG. 9E

| 610a | 610b | 610c | 610d₁ | 610d₂ | 610d₃ |
|---|---|---|---|---|---|
| Account Name Search Terms and Synonyms | Acct Type | Tax Category | TLA-S Corp | TLA-C Corp | TLA-LLP |
| Rent Expense; Equipment Rental; Office Rent; Office Exp; Space Lease; Leased Building; Rent; Equip Rental; Eq Rental; Equip Rent; Lease; Lease Expense; Lease Exp.; Equip. Rent; Equip. Lease | type_exp | Rent Expense - Office/Equipment | 1089 | 1309 | 1672 |
| Repairs & Maintenance; Repairs and Maintenance; R&M; Repair & Maint.; Repair & Maint.; Repair and Maint Repair and Maint.; Computer Repairs; Repair; Maint; Maint.; Painting; Paint; Plumbing; Building Repairs; Maintenance | type_exp | Repairs & Maintenance | 1086 | 1305 | 1668 |
| Retirement Plan Contributions; Retirement Plan - Shareholder; Retirement Plan - Shareholder; Shareholder Retirement; Retirement Plan S/h; S/H Retirement; Retirement Plan - Employee; Retirement Plan-Employee; Retirement Plan Empl; Empl Retirement; Retirement Plan; Retirement Contributions; Retirement Plan - Partner; Retirement Plan-Partner; Retirement Plan Ptnr. | type_exp | Retirement Plan Contributions | 1107 | 1323 | 1686 |
| Security; Alarm; Security Services | type_exp | Security | 3238 | 3038 | 3138 |
| Supplies; Operating Supplies; Supplies; Supplies Expense; Supplies and Materials; Materials and Supplies; Supplies & Materials; Materials & Supplies; Sales Materials; Shop Supplies; Shipping Supplies | type_exp | Supplies | 3216 | 3016 | 3116 |
| Taxes Other; Taxes-Other; Other Taxes; Taxes; Tax; Sales Tax; Sales & Use Tax; Sales and Use Tax; Use Tax; Excise Tax | type_exp | Taxes - Other | 1097 | 1317 | 1680 |
| Taxes - Payroll; Payroll Taxes; P/R Taxes; FICA; FUTA; Medicare; SUI; MCARE; Soc Security; Social Security; FUI; 941; 940; Federal Unemployment; State Unemployment; State Payroll Tax; State Payroll Taxes; State PR Tax; State P/R Taxes; State PR Taxes; Federal P/R Tax; Fed Payroll Tax; Federal Payroll Taxes; Federal P/R Tax; Federal PR Tax; Fed P/R Tax; Fed Payroll Taxes; Fed P/R Tax; Fed P/R Tax; FUTA tax.; Unemployment Tax; Unemployment Payroll Tax; FUTA Expense; Medicare Expense; S.S. Expense; CA SUI; CA SUI Expense; SUI Expense; SUI | type_exp | Taxes - Payroll | 1035 | 1315 | 1678 |
| Taxes - Property; Property Taxes; Prop Tax; Local Taxes; Local Property Taxes; City Business Tax; Business Tax; County Property Tax | type_exp | Taxes - Property | 1033 | 1313 | 1676 |

FIG. 9F

| Account Name Search Terms and Synonyms | Acct Type | Tax Category | TLA-S Corp | TLA-C Corp | TLA-LLP |
|---|---|---|---|---|---|
| Taxes - State Income/Franchise; State Income/Franchise Taxes; Taxes; State Tax; State Income Tax Franchise Tax; Taxes - State; Taxes - FTB; Taxes - State FTB; FTB; State Franchise; State Franchise Tax | type_exp | Taxes - State Income/Franchise | 1091 | 1311 | 1674 |
| Telephone/Internet; Telephone; Cell Phone; Communication Exp; Cell; Telephone Expense; Internet Charges; Internet Expense; Web Maintenance; Internet Fees; DSL; Cable; Web Hosting Fees; Web; Web Hosting; Domain Fees; Internet; Internet Service; Computer and Internet Expenses; Internet Expense; Internet Connection; Internet Connectivity; Phone; Internet Access; Blackberry; Cellular | type_exp | Telephone/Internet | 3218 | 3018 | 3118 |
| Tools; Small Tools; Hand Tools; Disposable Tools; Tools Expense | type_exp | Tools | 3219 | 3019 | 3119 |
| Travel; Air Fare; Lodging; Hotel; Rental Car; Cab Fares; Train; Travel Expense; Business Travel Expense; Airlines; Airline; Travel and Entertainment; Travel & Entertainment; Travel & Ent; Travel Costs; Airfare | type_exp | Travel | 3220 | 3020 | 3120 |
| Uniforms/Laundry; Uniforms; Uniforms Expense; Laundry; Laundry Expense | type_exp | Uniforms/Laundry | 3220 | 3020 | 3120 |
| Utilities; Water; Electric; Sewer; Trash; Gas and Electric; Gas & Electric; Gas & Elec; Utilities Expense | type_exp | Utilities | 3221 | 3021 | 3121 |
| Worker's Compensation; Workers Compensation; Worker's Compensation Insurance; Workers Compensation Insurance; Work Comp; Workman's Comp; Workmans Comp; Worker's Comp; Worker's Comp; WC; WC Insurance | type_exp | Worker's Compensation | 1157 | 1373 | 1740 |
| Other Expense; Other; Miscellaneous | type_exp | Other Expense | 1157 | 1373 | 1740 |
| Ask My Accountant | type_exp | Ask My Accountant | -1 | -1 | -1 |

IMPORTING ACCOUNTING APPLICATION DATA INTO A TAX PREPARATION APPLICATION

CROSS-REFERENCE TO RELATED APPLICATION

This application is a continuation of U.S. application Ser. No. 12/334,365, filed on Dec. 12, 2008, issued as U.S. Pat. No. 8,583,516 on Nov. 12, 2013, and entitled "IMPORTING ACCOUNTING APPLICATION DATA INTO A TAX PREPARATION APPLICATION, priority of which is claimed under 35 U.S.C. § 120 and all other applicable statutes, the contents of which are incorporated herein by reference as though set forth fully herein.

FIELD OF INVENTION

The invention relates to preparation of tax returns such as business tax returns.

BACKGROUND

Tax preparation applications have become very popular and allow a user, such as a taxpayer or a tax professional, to prepare and electronically file a tax return using a computer. While tax preparation applications have greatly simplified preparation of tax returns, importing data into the electronic tax return can sometimes be confusing, particularly when data is imported from another program, such as an accounting or finance program, and into the tax preparation application.

For example, it is known to manually map data of an accounting application to a particular line of a tax form of a tax preparation application utilizing a tax line assignment (TLA). For this purpose, a user selects a particular account of the accounting application and manually associates or assigns a TLA to that account. The manually assigned TLA identifies or refers to a tax form and line thereof in which data of the account should be entered when account data is imported into the tax preparation application.

While users may effectively manually assign TLAs to accounts of an accounting application, doing so can be complicated, confusing, tedious, time consuming and prone to user error. For example, the accuracy of manually assigned TLAs may depend upon the user's knowledge and the ability of the user to link the proper TLA to the account. Sometimes, this analysis is too "taxy" and beyond the user's understanding. These issues may arise multiple times if the user manually assigns tax information to multiple accounts.

SUMMARY

One embodiment is directed to a method for mapping data of an accounting application to a tax preparation application. The method comprises receiving account data comprising an account name from an accounting application. The method further comprises automatically determining a tax category that corresponds to the account name and automatically assigning a line of the form of the tax preparation application, e.g., via a TLA, to the account name based at least in part upon the determined tax category.

A further embodiment is directed to a method for mapping data of an accounting program to a tax preparation application utilizing a table or spreadsheet. The method comprises receiving account data comprising an account name from the accounting application, searching the table or spreadsheet of search terms for the account name, automatically determining a tax category corresponding to the account name based at least in part upon the account name matching a search term in the table or spreadsheet. A line of the form of the tax preparation application, e.g., via a TLA, is automatically assigned to the account name based at least in part upon the determined tax category.

In another embodiment, an article of manufacture comprising a computer program carrier readable by a computer and embodying one or more instructions executable by the computer to perform method steps comprising receiving account data from the accounting application, the account data comprising an account name, automatically determining a tax category corresponding to the account name, and automatically assigning a line of the form of the tax preparation application to the account name based at least in part upon the determined tax category.

In a further alternative embodiment, an article of manufacture comprising a computer program carrier readable by a computer and embodying one or more instructions executable by the computer to perform method steps comprising receiving account data from the accounting application, the account data comprising an account name, searching a table or spreadsheet of search terms for the account name, automatically determining a tax category corresponding to the account name based at least in part upon the account name matching a search term in the table or spreadsheet, and automatically assigning a line of the form of the tax preparation application to the account name based at least in part upon the determined tax category.

In one or more embodiments, account data comprises an account name and an account value. The account value is imported into the assigned line of the form of the tax preparation application.

In one or more embodiments, whether a tax category corresponds to an account name is automatically determined, and whether a table or spreadsheet is searched for this purpose depends on whether the account name was previously associated with a TLA or a line of the form of the tax preparation application. A TLA comprises a reference, e.g., a numeric reference or pointer, which identifies or refers to the line of the form of the tax preparation application that is assigned to the account name. For example, the tax category corresponding to the account name is automatically determined if a TLA or line of the form of the tax preparation application has not already been assigned to or is not associated with an account name. However, if a TLA or tax line of a form has already been assigned to or already is associated with an account name, then the tax category may still be automatically determined, i.e., by using a table or spreadsheet, if the TLA does not map to a specific tax category or, in other words, maps to a general, non-specific category such an "other" tax category, examples of which include other income, other expenses or other cost of goods sold.

In embodiments involving a table or spreadsheet that is used to automatically determine a tax category corresponding to an account name, the table or spreadsheet may comprise a plurality of rows and a plurality of columns. The columns may include a first column that includes one or more search terms that are related to or synonymous with the account name, a second column including one or more tax categories, and a third column including one or more references to a line of a tax form of the tax preparation application. A tax category corresponding to the account name can be automatically determined based at least in part upon the account name matching at least one search term in the first column, and the determined tax category in the second column of that row is mapped to a corresponding reference to the line of the tax form in the third column of that row. A user can be prompted to select one tax category that corresponds to the account name if there are multiple tax categories that may correspond to the account name. Further, a user can be prompted to manually select a tax category corresponding to the account name in the event that a search is performed but the account name does not match any search term in the table or spreadsheet.

In certain embodiments, the account name is a single term, and a tax category is determined based at least in part upon that single term exactly matching a single search term in a table or spreadsheet. In other embodiments, the account name comprises at least two terms, and the tax category corresponding to the account name is based at least in part upon the at least two terms exactly matching at least two search terms. In the event that a multi-term account name does not exactly match a corresponding number of search terms, one embodiment involves determining whether a prominent or significant term, e.g., the first term or the last term of the account name, exactly matches at least one search term in the table or spreadsheet. In an alternative embodiment, the multi-term account name can be parsed or divided into smaller or individual terms or character strings to determine if these smaller or individual terms match any search term in the table or spreadsheet. If the account name includes a conjunction, symbol or other relational or joinder element, the account name terms, and not the conjunction, symbol or other relational or joinder element, can be compared against search terms of the table or spreadsheet to determine a corresponding tax category.

In cases in which it is determined that multiple tax categories may correspond to a given account name, a user may be prompted to manually select one tax category that corresponds to the account name.

In certain embodiments, the effectiveness or accuracy of automatic tax category determinations may be tracked, e.g., based at least in part upon feedback from a user of the tax preparation application.

BRIEF DESCRIPTION OF THE DRAWINGS

The foregoing and other aspects of embodiments are described in further detail with reference to the accompanying drawings, wherein:

FIG. 6 illustrates one example of a lookup table or spreadsheet that may be utilized with embodiments;

FIG. 7 illustrates another example of a lookup table or spreadsheet that may be utilized with embodiments and that includes multiple TLA columns for different corporate entities;

FIG. 8 illustrates an example of a lookup table or spreadsheet and examples of search terms related to a dividend income tax category, account types and TLAs for different corporate entities;

FIGS. 9A-G illustrate a more detailed example of a lookup table or spreadsheet and examples of different search terms for different tax categories;

FIGS. 14A-L illustrate screen shots of one embodiment of a user interface that allows a user to categorize accounts and provide additional information relating to an account, wherein FIG. 14A is a screen shot of a user interface allowing a user to select execution of embodiments to automatically map accounting application data to a tax preparation application or to utilize a classic or manual import methods, FIGS. 14B-F are screen shots illustrating results of execution of embodiments for income, expense and cost of goods sold accounts and certain accounts that were mapped to a specific tax category and certain accounts that were mapped to an "other" or "needs more info" category, FIGS. 14G-I are screen shots illustrating how a user can be prompted to enter additional information relating to a tax category, selecting a tax category from a list of available tax categories or to indicate that a particular account should not be imported into the tax preparation application, and FIGS. 14J-K are screen shots illustrating how user can be prompted to enter additional information related to certain accounts, and FIG. 14L is a screen shot illustrating confirmation that account data was imported into a tax preparation application.

DETAILED DESCRIPTION OF ILLUSTRATED EMBODIMENTS

Embodiments are directed to automatically mapping or associating data of an accounting application to appropriate sections or forms of a tax preparation application. Account data of an accounting or finance application can be automatically categorized and imported into a tax preparation application utilizing an intermediate element, reference or pointer that is used to identify a form or line thereof of the tax preparation application that should be assigned to or associated with the account of an accounting application. According to one embodiment, the intermediate element, reference or pointer is a tax category that is automatically determined based at least in part upon an identifier or name of the account or a portion thereof matching a search term of a table or spreadsheet. A table or spreadsheet can include various tax categories and corresponding TLAs or references to a tax form and line thereof, and a match between an account name and a search term associated with a tax category is used to determine a TLA to be assigned to that account. Account data may then be imported into the tax preparation application according to the automatically assigned TLA.

Embodiments that automatically categorize account names and allow for automatic importing of account data into a tax preparation application eliminate or reduce the need for users to manually assign tax form information to accounts, facilitate categorization of account data to an appropriate tax form and section or line thereof, facilitate importing of the account data into the appropriate tax form and section or line thereof, reduce or simplify decisions of the user, and reduce the time that is needed to import data from an accounting application into a tax preparation application. Embodiments also provide for user input when automated processes do not yield a specific result and/or to allow a user to select among multiple tax category choices, as discussed in further detail below with further reference to FIGS. 1-15.

Figure 1:
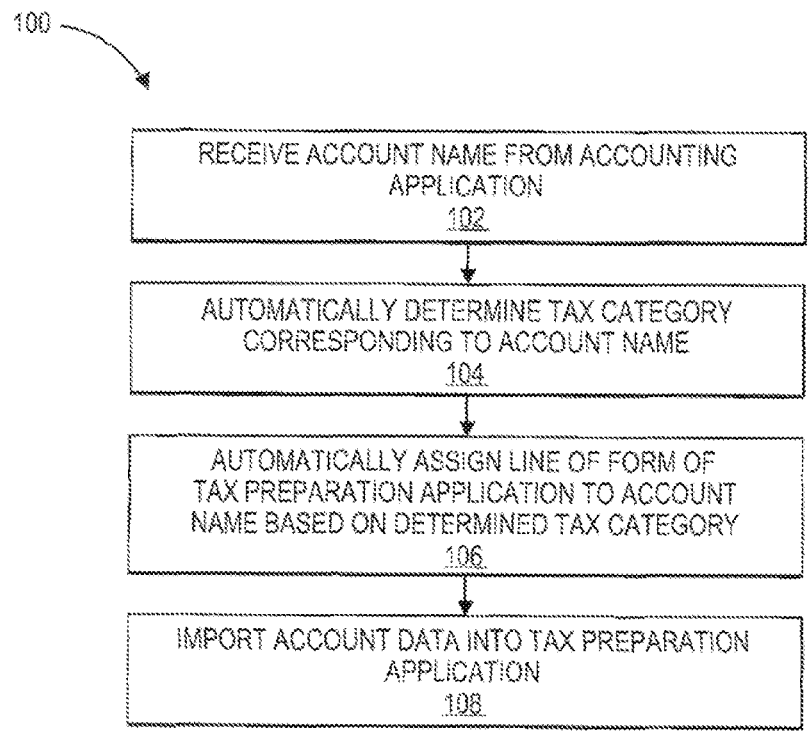
FIG. 1 is a flow diagram of a method for automatically mapping account data of an accounting application to a tax form of a tax preparation application according to one embodiment.
Figure 2:
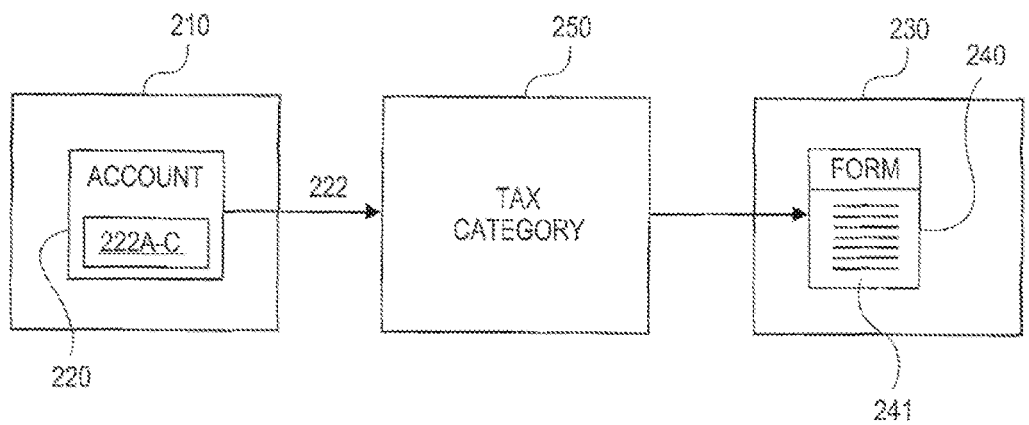
FIG. 2 illustrates a system for automatically mapping account data a tax preparation application as shown in FIG. 1.

Referring to FIGS. 1 and 2, one embodiment is directed to a method 100 for automatically mapping or linking data of an account 220 of an accounting or finance application 210 (generally referred to as an accounting application 210) to a tax preparation application 230. According to one embodiment, the accounting application 210 is a business accounting application such as QuickBooks®, and the tax preparation application 230 is a business tax preparation application such as TurboTax® for Business. QuickBooks® and TurboTax® are registered trademarks of Intuit Inc. Embodiments may also be implemented using other accounting applications 210 including, for example, Quicken®, Microsoft® Money and Microsoft® Money Plus, FreshBooks and Peachtree®. Quicken® is a registered trademark of Intuit Inc., Microsoft® is a registered trademark of Microsoft Corporation, and Peachtree® is a registered trademark of Sage Software, Inc. Embodiments may also be utilized with other tax preparation applications 230 including, for example, ProSeries® and Lacerte® tax preparation applications, H&R Block TaxCut software, and TaxACT® software. ProSeries® and Lacerte® are registered trademarks of Intuit Inc., and TaxACT® is a registered trademark of $2^{nd}$ Story Software, Inc. Further, embodiments may be implemented using desktop or on-line versions of the accounting application 210 and/or tax preparation application 230. For ease of explanation and illustration, reference is made to an accounting application 210 and a tax preparation 230 generally, examples of which include QuickBooks® and TurboTax® for Business, but it should be understood that other accounting applications 210, tax preparation applications 230 and combinations thereof, including desktop and on-line versions thereof, may be utilized.

A business accounting application 210 such as QuickBooks® allows a user to manage and process various types of business accounts 220 including, for example, "income" accounts, "expense" accounts and "cost of goods sold" or "COGS" accounts that are used to group transactions for accounting and reporting purposes. For example, expense accounts 220 may relate to office supply expenses, advertising expenses and rent expenses, and income accounts 220 may relate to interest income and dividend income. An account 220 is typically identified, defined or associated with different types of data including an account name 222a (which may be selected or assigned by a user), an account value 222b and other information such as the type 222c of account. Data 222a-c is generally referred to as data 222 for ease of explanation.

The account name 222a may be a name of a company (e.g., Office Max) to which the account 220 relates or a descriptive term (e.g., office supplies). The account name 222a may be a single term or word or multiple terms or words (generally referred to as terms). Further, an account name 222a may have complete terms and/or abbreviations or shorthand references thereto. An account name 222a may also be a number and a combination of terms and numbers. The account value 222b represents the amount of the account 220, and the account type 222c may be, for example, an "expense" account ("type_exp") an "income" account ("type_inc") and a "COGS" account ("type_cogs"). For example, an "expense" account 220 may be named "office supplies" and have a value of $500 indicating that $500 was spent on office supplies. As another example, an income account 220 named "interest" or "Int" having a value of $50 indicates that $50 of interest was earned.

At stage 102, data 222 of the account 220, e.g., the name 222a of the account 220, is accessed by or received by the tax preparation application 210. At stage 104, an intermediate element, reference or pointer 250 in the form of a tax attribute or tax category (generally referred to as tax category 250) that corresponds to, relates to, or that is synonymous with the account name 222a, is automatically determined. FIG. 2 illustrates the tax category 250 separated from the tax preparation application 230. According to one embodiment, and as described in further detail with respect to other figures, the tax category 250 is part of the tax preparation application 230, but the tax category 250 and related determinations may be within or executed by another system component. At stage 106, one or more lines 241 of the tax form 240 of the tax preparation application 230 are determined based at least in part upon the determined tax category 250. The tax form 240 and line 241 thereof are automatically assigned to or are associated with the account 220 based at least in part upon the tax category 250 corresponding to the account name 222a. At stage 108, account data 222, e.g., the account value 222b, may be automatically imported into the determined tax form 240 and line 241 thereof based at least in part upon the result of stage 106.

Figures 3, 4:
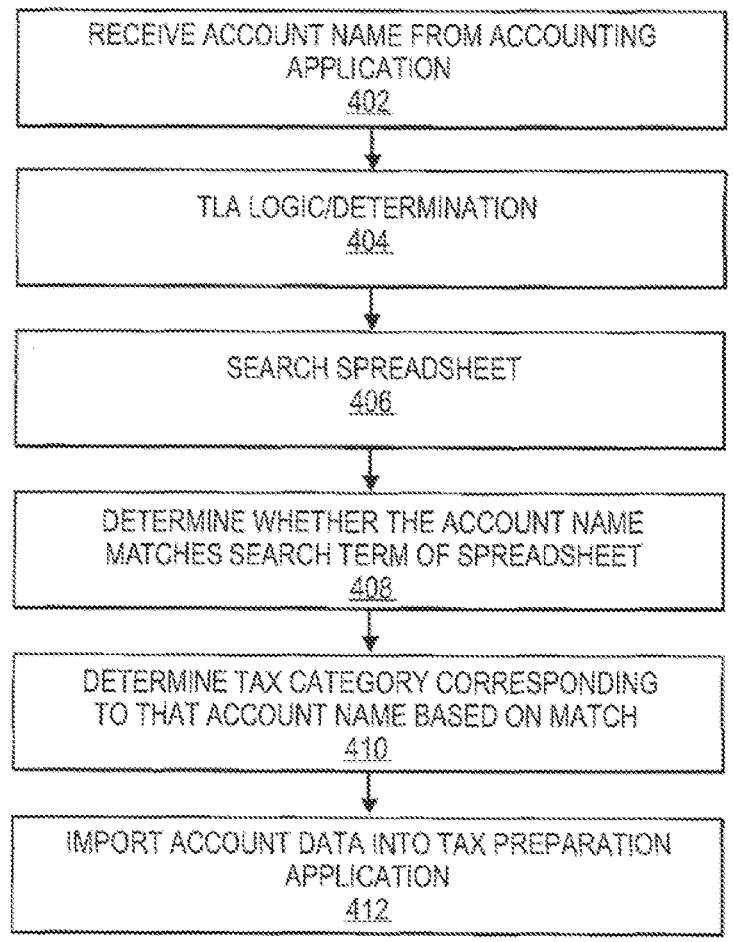
FIG. 3 generally illustrates a TLA that refers to or identifies a tax form and line thereof.
FIG. 4 is a flow diagram of a method for automatically mapping account data of an accounting application to a tax form of a tax preparation application utilizing a lookup table or spreadsheet according to one embodiment.

According to one embodiment, a specific line 241 of a specific tax form 240 is determined and automatically assigned to the account name 222a. According to another embodiment, as generally illustrated in FIG. 3, tax line assignment (TLA) 300 is assigned to or associated with the account name 222a. FIG. 3 generally illustrates that a TLA 300 identifies or is programmed or configured to identify a specific line 241 of a specific tax form 240. Thus, a line 241 of a tax form 240 can be directly identified or indirectly identified by a TLA 300 such that a line of a form or a TLA is assigned to the account name based at least in part upon the determined tax category. For ease of explanation, this specification refers to identifying a tax line 241 of a tax form 240, which may be done directly or using a TLA 300. Further embodiments and further details regarding how embodiments may be implemented are described with reference to FIGS. 4-15.

Figure 5:
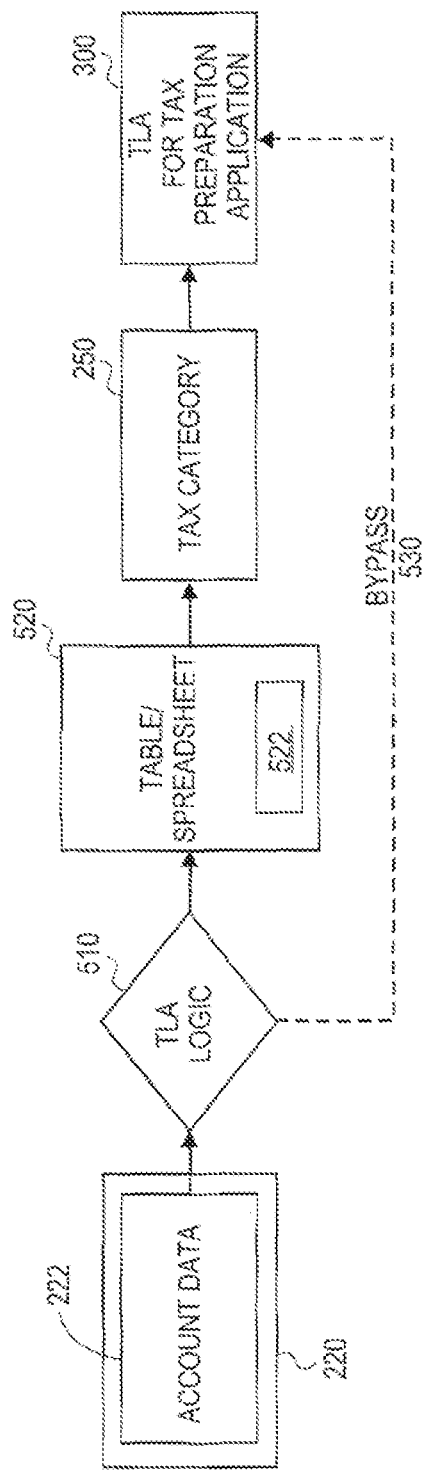
FIG. 5 illustrates a system for automatically mapping account data to a tax preparation application utilizing a lookup table or spreadsheet as illustrated in FIG. 4.

Referring to FIGS. 4-5, one embodiment is directed to a method 400 for automatically categorizing and mapping data 222 of an account 220 of an accounting application 210 to a tax preparation application 230 and comprises accessing or receiving account data 222 including an account identifier or name 222a as described above at stage 402, and executing TLA logic 510 to determine whether a TLA 300 has already been assigned to the account 220 at stage 404. TLA logic 510 may be implemented in software, hardware or a combination thereof. Depending on the result generated by the TLA logic 510, the method proceeds to searching a lookup table or spreadsheet 520 (generally referred to as spreadsheet 520) at stage 406. The lookup at stage 406 and related stages may be bypassed 530 depending on the result of the TLA logic 510 as discussed in further detail below. For example, if no TLA 300 was previously assigned to the account 220, then the method proceeds to search the spreadsheet 520 at stage 406. However, in certain instances in which a TLA 300 was previously assigned to the account 220, then searching of the spreadsheet 520 at stage 406 and other associated stages can be bypassed 530, and the previously assigned TLA 300 can be utilized to import account data 222 into the tax preparation application 230. Further aspects of one embodiment of TLA logic 510 are described with reference to FIG. 10.

One spreadsheet 520 that can be utilized with embodiments utilizes a comma separated value (CSV) file format. One example of a spreadsheet 520 configured in this manner and that may be utilized with embodiments is an Excel® spreadsheet. Excel® is a registered trademark of Microsoft Corporation. Other tables and spreadsheets 520 that utilize CSV files may also be utilized, and an Excel® spreadsheet is provided as one example of how embodiments may be implemented. Further, embodiments may be adapted for use with lookup tables and spreadsheets 520 that use other file formats.

Referring again to FIG. 4, and with further reference to FIG. 6, at stage 408, the method proceeds to determine whether the account identifier or name 222a matches a search term 522 of the spreadsheet 520. FIG. 6 generally illustrates a spreadsheet 520 that includes multiple columns 610a-d (generally 610) and one or more rows 620a-n (generally 620). In the illustrated embodiment, a first column 610a includes one or more rows 620 of one or more search terms (ST) 522 that are separated by commas, but in other embodiments, semicolons are utilized to separate search terms 522. Semicolons may be utilized to separate search terms 522 rather than commas to prevent raw data in the .CSV file from being surrounded by quotations marks as a result of using commas.

In the embodiment shown in FIG. 6, each of the first and second rows 620a, 620b includes three search terms 522 (ST1-ST3 and ST4-ST6), and the third row 620c includes two search terms 255 (ST7-ST8). FIG. 6 is provided to generally illustrate search terms 522, and it should be understood that embodiments may be implemented with various numbers (n) of rows 620, e.g., one or multiple rows 620, e.g., tens or hundreds or rows 620, and each row 620 may have the same or different numbers of search terms 522, e.g., one, two, five, ten twenty and other numbers of search terms 522. The second column 610b identifies an account type (AT) associated with the search terms 522 and a tax category 250 in the third column 610c. As discussed above, examples of account types 222c include income, expense and COGS.

The fourth column 610d identifies a TLA 300 that corresponds to a particular tax category 250. In certain embodiments, and depending on the accounting application 210 and tax preparation application 230 that are utilized, the spreadsheet 520 may include additional TLA 300 columns, e.g., as shown in FIG. 7. FIG. 7 illustrates three TLA columns 610d1-610d3, one column for each of three different corporate entities such as a C corporation, a S corporation and a partnership, one example of which is a Limited Liability Partnership (LLP). Persons of ordinary skill in the art will appreciate that embodiments may involve different numbers and types of corporate entities, and C and S corporations and a LLP are provided as illustrative examples for ease of explanation and illustration.

Referring again to FIGS. 4-5, depending on whether the account name 222a matches a search term 522 of the spreadsheet 520, at stage 410, the method proceeds with automatically determining a tax category 250 corresponding to that account name 222a based at least in part upon the account name 222a matching a search term 522. At stage 412, a line 241 of a form 240 or a TLA 300 corresponding to the determined tax category 250 (e.g., in the same row as the determined tax category 250) is assigned to the account 220. Account data 222 such as the account value 222b may then be imported into the tax preparation application 130 using the determined TLA 300.

FIGS. 8 and 9A-G illustrate examples of a spreadsheet 520 that may be utilized in embodiments and examples of account names 222a and search terms 522 that are related to or associated or synonymous with account names 222a. Referring to FIG. 8, which illustrates a spreadsheet 520 including one row 620a (for ease of illustration and explanation), a column 610a includes search terms 522 that are related to or synonymous with account names 222a that may be assigned by a user and related to dividend income. In the illustrated embodiment, there are four search terms 522a-d- "Dividend Income" 522a, "Div Inc" 522b, "Dividend" 522c and "Div" 522d.

According to one embodiment, search terms 522 are selected manually, e.g., by a developer of the tax preparation application 130, for inclusion in the spreadsheet 250. Criteria for selecting a search term 522 may include, for example, a search term 522 being similar to, related to, or synonymous with possible account names 222a that may be selected by a user of the accounting application 210, based at least in part upon feedback or surveys from users of the accounting application 210 and/or the tax preparation application 230, and based at least in part upon search terms 522 being synonymous or related to an account name 222a according to a dictionary or thesaurus. Search terms 522 may also be selected and/or added to the spreadsheet 250 in automated manner, e.g., using a database of terms, surveys, dictionary, thesaurus and other electronic sources of information. Thus, when a spreadsheet 520 is searched to determine whether it contains a search term 522 matching an account name 222a, in the illustrated example, the search terms 522 that are searched are "Dividend Income", "Div Inc", "Dividend" and "Div" and these search terms 522 are compared to the account name 222a. If the account name 222a matches a search term 522, then it is determined that that particular account 220 can be automatically categorized as "Dividend Income" as in column 610b which, in turn, indicates the TLA 300 can be automatically assigned to that account 220 for a given corporate entity. In the illustrated example, it is determined that a TLA 300 for a C corporation of 1037, a TLA for an S corporation of 1499, and a TLA 300 of limited liability partnership is 1811 is assigned to the account name 222a.

FIGS. 9A-G illustrate one embodiment of a spreadsheet 520 in further detail that includes additional rows 620 and illustrates how a spreadsheet 520 be used to map account names 222a to different tax categories 520 involving different types 222c of income, expenses and COGS, and how those tax categories 250 can be mapped to a TLA 300 for a corporate entity. In the illustrated embodiment, as one example, if a name 222a of an account 220 is "Charity", then stage 408 results in this account name 222a matching a search term 522 in row 17. This account 220 is categorized as "Charitable Contributions" and assigned TLA 1101 for a C Corporation, TLA 1510 for an S Corporation, and TLA 1829 for a LLP. FIGS. 10-14 are more detailed flow charts illustrating embodiments and how a TLA 300 can be associated with or assigned to different types of account names 222a, and how account names 222a can be processed or analyzed for purposes of comparing account names 222a or portions thereof to search terms 522 in the spreadsheet 520.

Figure 10:
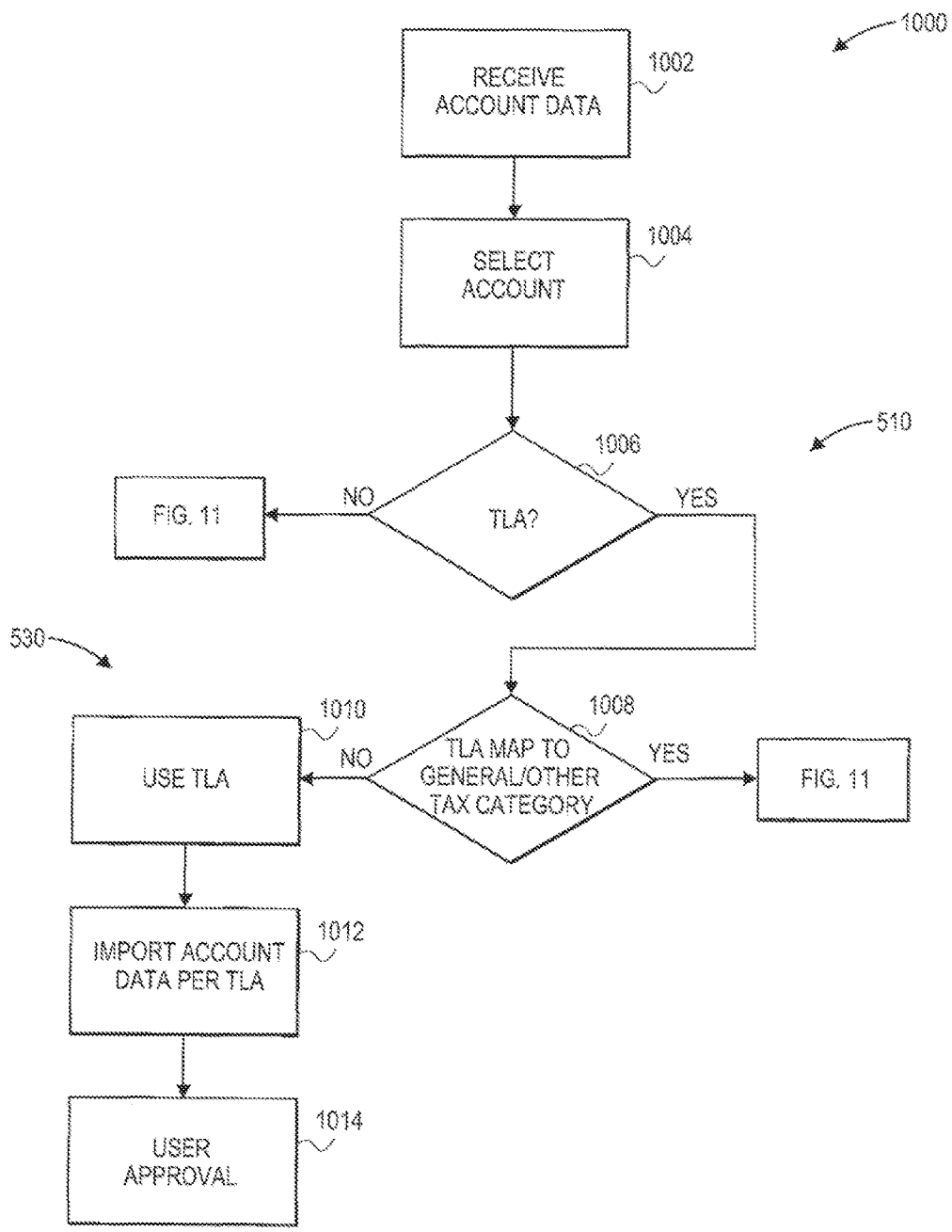
FIG. 10 is a flow diagram illustrating method steps of embodiments including determining whether a TLA was previously manually assigned to an account name.

Referring to FIG. 10, in a method 1000 for mapping data 222 of an accounting application 220 to a tax preparation application 230 according to one embodiment, data 222 (e.g., the account name 222a) of one or multiple accounts 220 of the accounting application 210 is received or accessed by the tax preparation application 230 or an associated processing element at stage 1002. At stage 1004, if there are multiple accounts 220, one account 220 is selected. It should be understood that various method steps can be repeated or performed in parallel for additional accounts 220, and selection of one account 220 is described for ease of explanation.

At stage 1006, it is determined whether a TLA 300 has already been manually assigned to the selected account 220 by a user. If not, then the method proceeds to FIG. 11. If so, then another determination is made at stage 1008 whether the TLA 300 maps to a generic, non-specific, default or "other" tax category (e.g., "other" income, expense or COGS). If not, i.e., if the TLA 300 maps to a specific tax category besides a generic or "other" tax category, then the account 220 is already associated with a specific tax category 250, and the previously assigned TLA 300 is utilized at stage 1010. Thus, account data 222 (e.g., the account value 222b) is imported into the tax preparation application 230 at stage 1012 according to that TLA 300, before or after approval by the user at stage 1014. Otherwise, if the previously assigned TLA 300 maps to a generic "other" tax category, then the method proceeds to FIG. 11, as is also the case if no TLA 300 was previously assigned to the account 200 in the illustrated embodiment.

Figure 11:
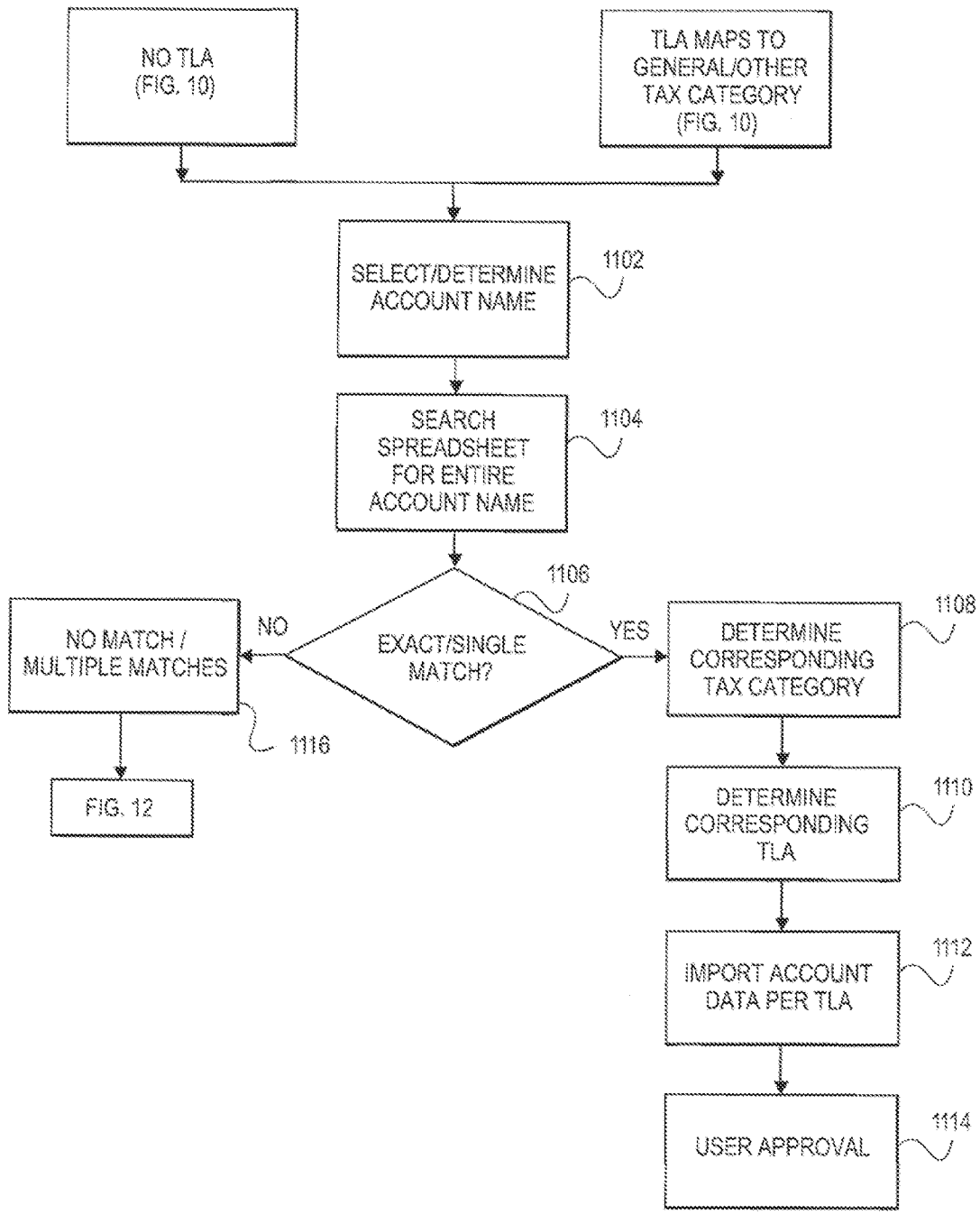
FIG. 11 is a flow diagram illustrating method steps of embodiments including searching a lookup table or spreadsheet and determining whether an account name matches a search term of the lookup table or spreadsheet.

Referring to FIG. 11, if the account 220 is not associated with a previously assigned TLA 300, or if the account 200 was previously assigned a TLA 300 that maps to a generic, default or "other" tax category 250, then at stage 1102, the name 222a of the account 220 is determined, e.g., using a string lookup, and at stage 1104, the table or spreadsheet 520 is searched. At stage 1106, the account name 222a is compared to search terms 522 of the spreadsheet 520 to determine whether the account name 222a matches any search term 522.

In the embodiment illustrated in FIG. 11, the initial determination is whether there is a single match, i.e., an exact match of the entire account name 222a (all of the account name 222a terms) and a search term 522. For example, a single, exact match of "Dividend" would be "Dividend" as opposed to "Dividend Payment" or "Dividend Income" or "Div" and a single, exact match of "Shareholder Disability Insurance" would be the same three terms "Shareholder Disability Insurance" as opposed to only "Shareholder Disability" or "Disability Insurance" or "Shareholder Disability Ins".

Thus, there may be instances in which there is one exact match, i.e., the entire account name 222a matches the entire search term 522, and in these cases, at stage 1108, the tax category 250 within the row 620 that includes the matching search term 522 is determined, and at stage 1110, that tax category 250 is utilized to determine the corresponding TLA 300 (also in the same row as the tax category 250 in the illustrated embodiment) that should be assigned to or associated with that particular account 220. Account data (e.g., the account value 222b) may then be imported into the appropriate line 242 of a tax form 240 of the tax preparation application 230 according to the TLA 300 at stage 1112, before or after user approval at stage 1114 (if necessary). Otherwise, at stage 1116, the result of the determination at stage 1106 is that there is not an exact match, or the account name 220 matches multiple search terms 522 in different rows 620. For example, an account name 222a "Income" may match multiple search terms 522 that appear in different rows 620 of the spreadsheet 520, and the method proceeds to FIG. 12.

Figure 12:
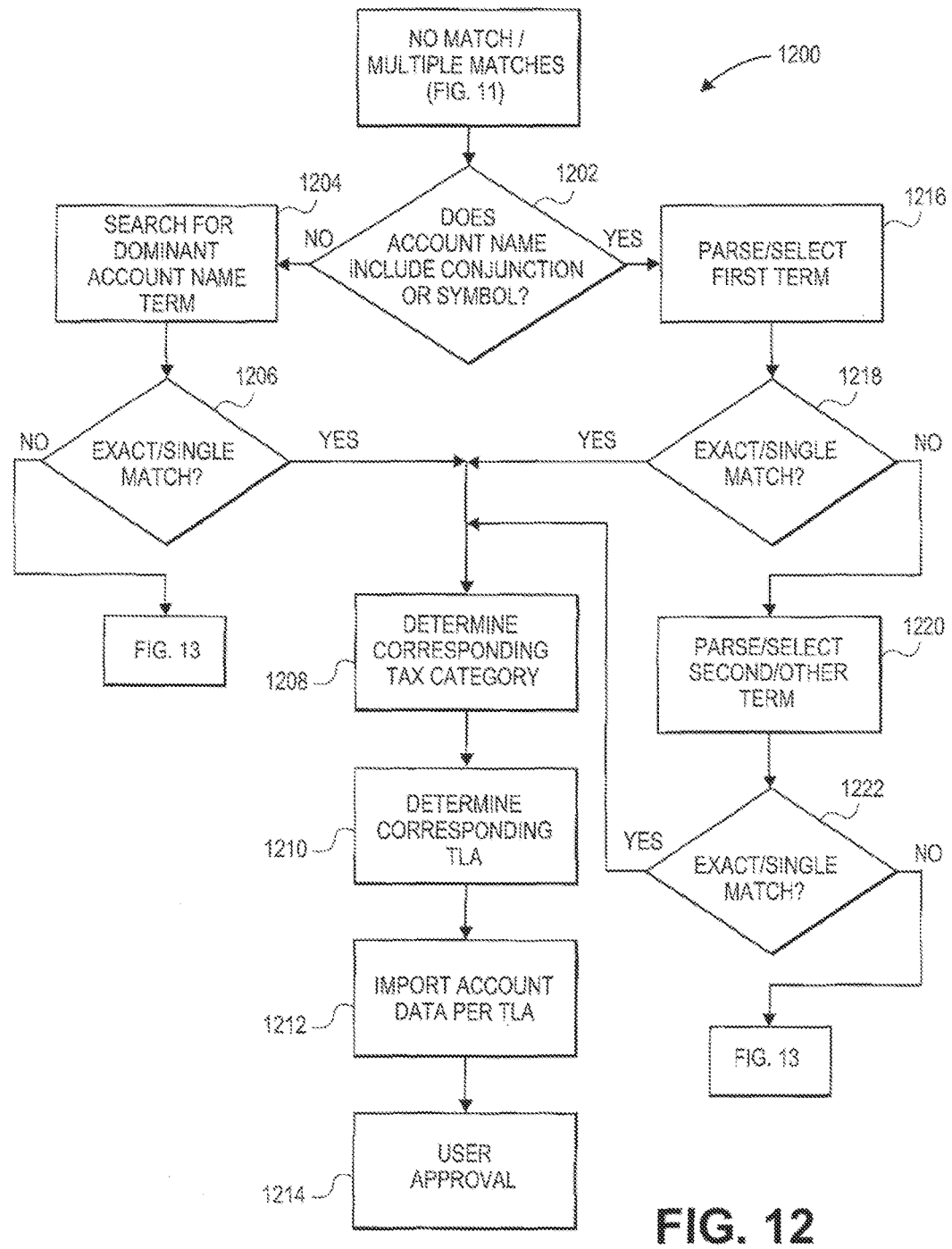
FIG. 12 is a flow diagram illustrating method steps of embodiments including processing terms of an account name that includes a conjunction, symbol or other relational or joinder element.

Referring to FIG. 12, in the illustrated embodiment, if there is not a single, exact match or if there are multiple matches, then at stage 1202, a determination is made whether the account name 222a includes a conjunction, symbol or other relational or joinder element. Examples of a conjunction, symbol or other relational or joinder element include "and", "or", "-" "/", "&", "?", "*" etc. If the account name 222a does not include any such element, then at stage 1204, a prominent or dominant term (generally referred to as dominant term) of the account name 222a is compared against the search terms 522. According to on embodiment, a dominant term is a pre-determined term or position of the term within the account name 220 that is more likely to match a search term 522 of the spreadsheet 520. According to one embodiment, the dominant term is the first term of the account name 222a. According to another embodiment, the dominant term is the last term of the account name 222a. Other embodiments may involve a combination of terms as a dominant term.

For example, if the user of the accounting application 210 named an account 220 "My insurance" then the last term "insurance" may be selected and compared against search terms 522 of the spreadsheet 520 if the last term of the account name 222a was previously selected to be the dominant term. Embodiments can be applied to account names 222a of different numbers of terms, and different terms of an account name 222a can be selected and compared to search terms 522.

Figure 13:
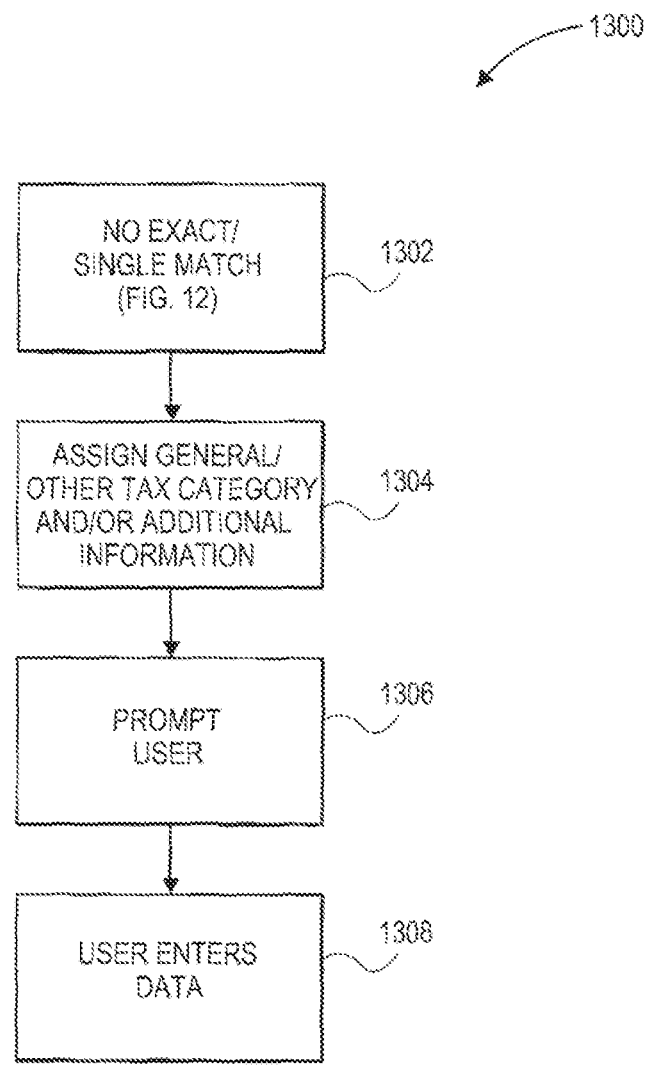
FIG. 13 is a flow diagram illustrating method steps of embodiments including processing of account names that are not specifically categorized using embodiments illustrated in FIGS. 10-12 and requesting user input.

With regard to stages 1204 and 1206, if the account name 222a is a single term, or if no individual or dominant term matches a search term 522 of the spreadsheet 520, then it is determined at stage 1206 that there continues to be an absence of an exact, single match, and the method proceeds to FIG. 13. However, if an individual or dominant term matches a single search term 522 in the spreadsheet 520, then at stage 1208, the tax category 250 corresponding to the search term 522 that matches the dominant term of the account name 222a is determined, i.e., the tax category 250 in the same row 620 as the matching search term 522, the corresponding TLA 300 is determined at stage 1210, and at stage 1212, the account data (e.g., account value 222b) may be imported into a line 241 of a tax form 240 based at least in part upon that TLA 300, before or after user approval at stage 1214 (if necessary). Otherwise, if the account name 222a or dominant term thereof matches multiple search terms 522, then the method proceeds to FIG. 13.

Referring to stage 1202 of FIG. 12, if the account name 222a includes a conjunction, symbol or other relational or joinder element, then at stage 1216 the terms of the account name 222a are parsed, and one term, e.g., a first term or another term, is selected. At stage 1218, a determination is made whether the selected parsed term matches a search term 522 of the spreadsheet 520. If so, then the method proceeds to stages 1208-1214 as discussed above. If not, at stage 1220, another parsed term, e.g., the second term of the account name 222a, is selected, and at stage 1222, it is determined whether there is an exact match between the parsed, second term and a search term 522 of the spreadsheet 520. If so, then the method proceeds to stages 1208-1214 as discussed above. Otherwise, parsing of account name 222a terms can be repeated as necessary, e.g., if an account name 222a includes three or more terms. Further, in another embodiment, the conjunction, symbol or other relational or joinder element is ignored, and the remaining terms are considered to be the account name 222a, and the entire account name 222a may then be searched. Thus, the method proceeds to FIG. 13 if there is no exact match of a dominant term (result of stage 1206) or if there is no exact match of a parsed term (stages 1218 and 1222).

Referring to FIG. 13, at stage 1302, the account name 222a is assigned a general, generic or non-specific "other" tax category 520 and/or as "requiring additional information". In these cases, a user of the tax preparation application 230 may be prompted at stage 1304 to provide input or additional information regarding this "other" tax category 250 or select a tax category 250 from a list of tax candidate tax categories 250 determined by embodiments or the tax preparation application. For this purpose, the account type 222c may be used to filter list of potential tax category 250 matches and guide a user to the correct tax category 250. For example, "expense" tax categories 250 would not be presented or available as an option that could be selected if it is known that the account type 222c is "income" instead. However, certain terms may be allocated to multiple account types, e.g., an account name "Commission" may be an expense or income such that both types of tax categories 250 are presented to the user.

In response to user input at stage 1308, the tax category 250 is confirmed or selected, and any additional information is entered. The TLA 300 corresponding to the selected tax category 250 is then assigned to that account 220. Alternatively, the user can manually assign a TLA 300 to that account 220 and provide other additional information as appropriate. Account data 222 may then be imported into the tax preparation application 130 using the assigned TLA 300. The user may also input other information that may be required or related to other tax considerations, e.g., specifying a percentage or portion of an expense is tax deductible. Further, the user can select that data 222 of this account 220 should not be imported into the tax preparation application 130.

The following example is provided with reference to FIG. 7 to illustrate how methods illustrated in FIGS. 10-13 may be applied. In a first example, assume the account 220 is named "Stock Dividend" and no TLA 300 was previously assigned to this account 220. Referring to FIGS. 10 and 11, the account name 222a "Stock Dividend" is compared to the search terms 252 in the spreadsheet 250 shown in FIG. 7 to determine whether the account name 222a is an exact, single match to any search term 522. In this example, there is no exact match since the search terms 522 are "Dividend income", "Div Inc", "Dividends" and "Div". Proceeding to FIG. 12, the account name 222a does not include a conjunction, symbol or joinder, and a pre-determined dominant term, e.g., the last term, may be analyzed and in this example, the last term is "Dividend." This term matches the search term 522 "Dividend" thus resulting in a single, exact match. Based at least in part upon this single, exact match, the tax category 250 "Dividend Income" is determined, and the corresponding TLA 300 for the appropriate corporate entity is automatically assigned to this account 220.

In a second example, assume the account 220 is named "Stock & Dividend" and no TLA 300 has been previously assigned to this account 220. Referring to FIGS. 10 and 11, the account name 222a "Stock & Dividend" is compared to the search terms 522 in the spreadsheet 520 shown in FIG. 7 to determine whether the account name 222a is an exact, single match to any search term 522. In this example, there is no exact match since the search terms 522 are "Dividend income", "Div Inc", "Dividends" and "Div". Proceeding to FIG. 12, the account name 222a includes a conjunction, symbol or joinder (the "&" symbol). The account name 222a is parsed and "Dividend" for example, can be compared to the search terms 522 of the spreadsheet 520. This parsed term matches the search term 522 "Dividend" thus resulting in a single, exact match. The tax category 250 "Dividend Income" can then be determined, and the corresponding TLA 300 for the appropriate corporate entity can be assigned to this account 220.

In a third example, assume the account 220 is named "Stock' and no TLA 300 has been previously assigned to this account 220. Referring to FIGS. 10 and 11, the account name 222a "Stock" is compared to the search terms 522 in the spreadsheet 520 shown in FIG. 7 to determine whether the account name 222a matches any search term 522. In this example, there is not an exact match since the search terms 522 are "Dividend income", "Div Inc", "Dividends" and "Div". Proceeding to FIG. 12, the account name 222a does not include a conjunction, symbol or joinder (since there is only one term) and analyzing a dominant term does not change the result since the account name 222a has only one term. Proceeding to FIG. 13, there is no exact, single match, and this account 220 may then be categorized as "other" and/or marked as requiring additional information. Referring to FIG. 13, a user can provide input regarding the appropriate tax category 250 to determine the corresponding TLA 300 and other information as appropriate.

Embodiments described with reference to FIGS. 1-13 can be implemented using various user interfaces to allow the user to navigate through the various method steps, manually select or input a tax category 250 that corresponds to a particular account name, select a tax category 250 from multiple possible tax categories 250, e.g., in cases in which an account name 222a may relate to various different tax categories 250, and/or provide further information if an account 220 is marked "additional information required." For example, an account name 222a "insurance" may result in multiple matches with search terms 522 related to "car insurance" "health insurance", etc. In one embodiment, a user is presented with these different "insurance" choices and selects the appropriate type of insurance such that the corresponding tax category 250 and TLA 300 are selected and associated with the account 220 named "insurance". As another example, an expense account may involve tax deductible expenses, and a user can be prompted to enter additional information comprising a portion of the expense that is tax deductible.

Figure 14A:
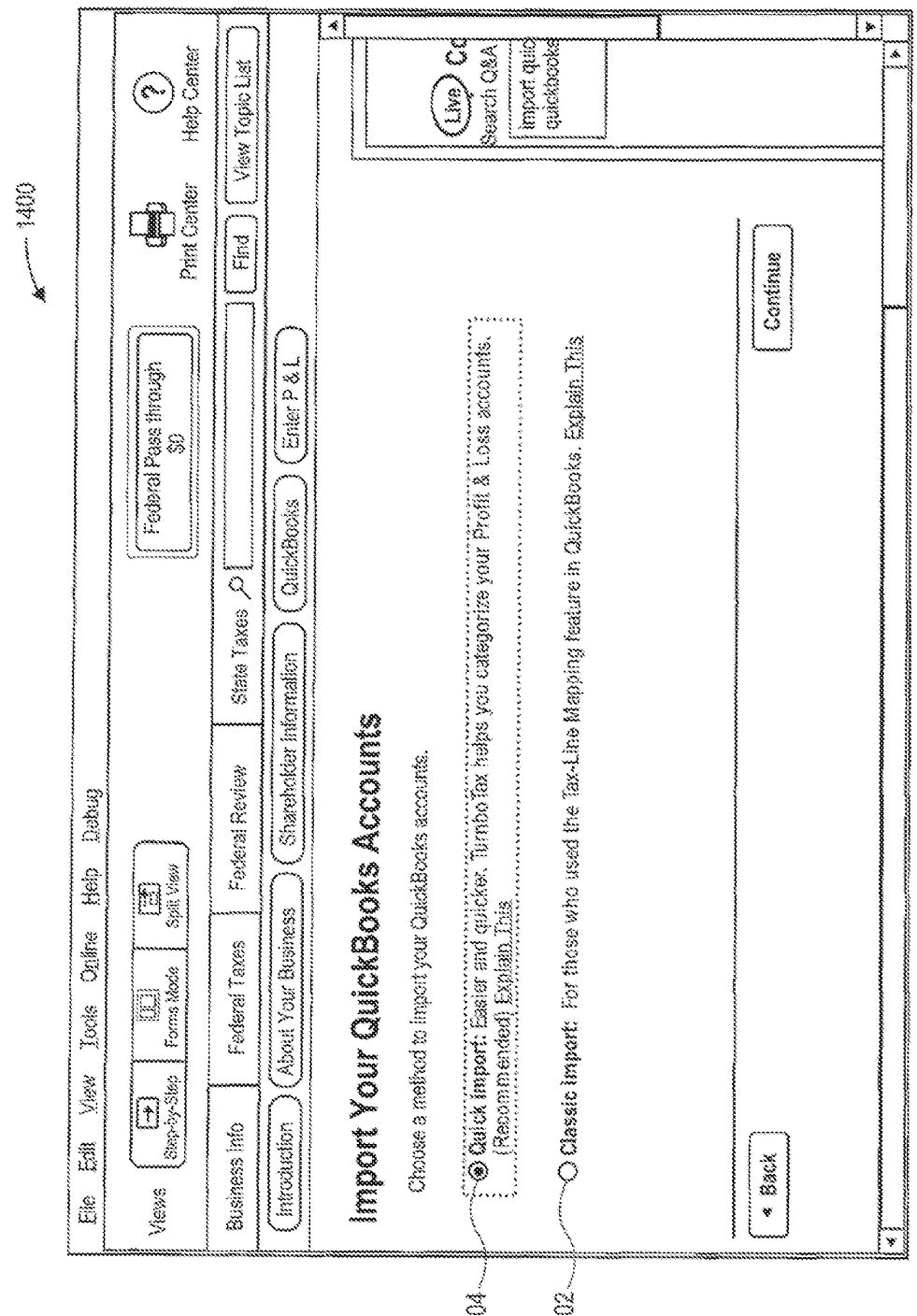

FIGS. 14A-L illustrate screen shots of one embodiment of a user interface of a TurboTax® for Business tax preparation application 130 that may be utilized with or to execute various method steps described above. Referring to FIG. 14A, in one embodiment, a user may initially be presented with a screen 1400 that provides the user a choice whether to use a known, classic import method 1402 in which the user manually assigns TLAs 300 to respective accounts 220, or "Quick Import" 1404, which launches embodiments of the invention, e.g., as described with reference to FIGS. 1-13.

As a result of selecting "Quick Import" 1404, account names 222a of the accounting application 110 are received or accessed by the tax preparation application 130, TLA logic 510 is executed to determine whether a TLA 300 has already been assigned, tax categories 250 and corresponding TLAs 300 are determined using a spreadsheet 520 and search variations (e.g., searching of dominant terms, parsed first or last terms, symbol processing, etc.) as appropriate.

FIGS. 14B-F illustrate a screen or summary 1410 that shows the tax category 250 that was determined as a result of execution of one or more embodiments described with reference to FIGS. 1-13. In the illustrated example, the screen or summary 1410 includes tax categories 250 that were assigned for 16 income accounts, 32 expense accounts, and four COGS accounts. The first column 1412a includes account names 222a, the second column 1412b includes the value 222b or amount of the respective accounts 220, and the third column 1412c includes respective tax categories 250 that were determined as a result of execution of embodiments. An "edit" button 1414 is provided to allow the user to edit the accounts 220, e.g., manually assign or change the tax category 250 and/or provide further information about an account 220.

Figure 14B:
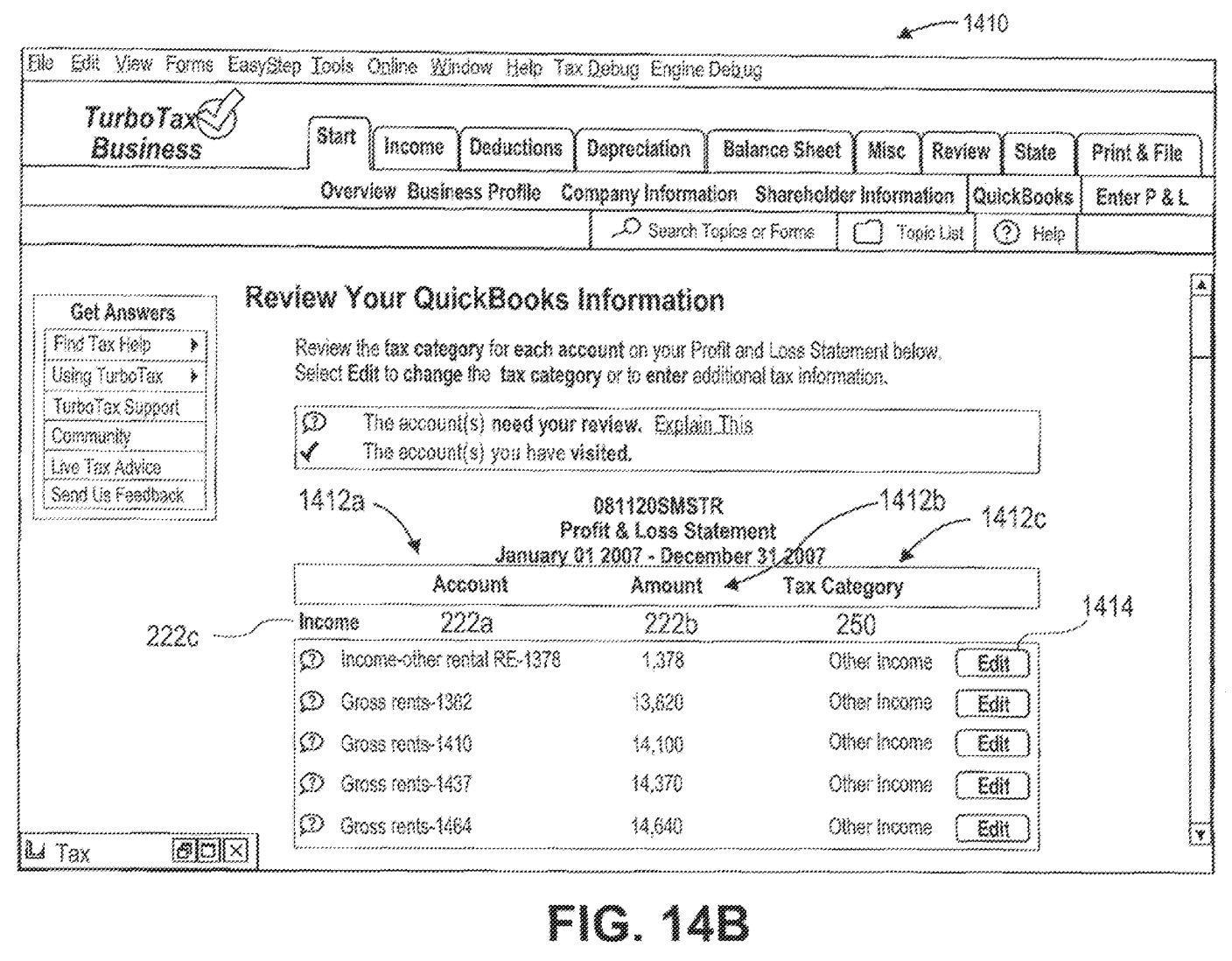
Figure 14C:
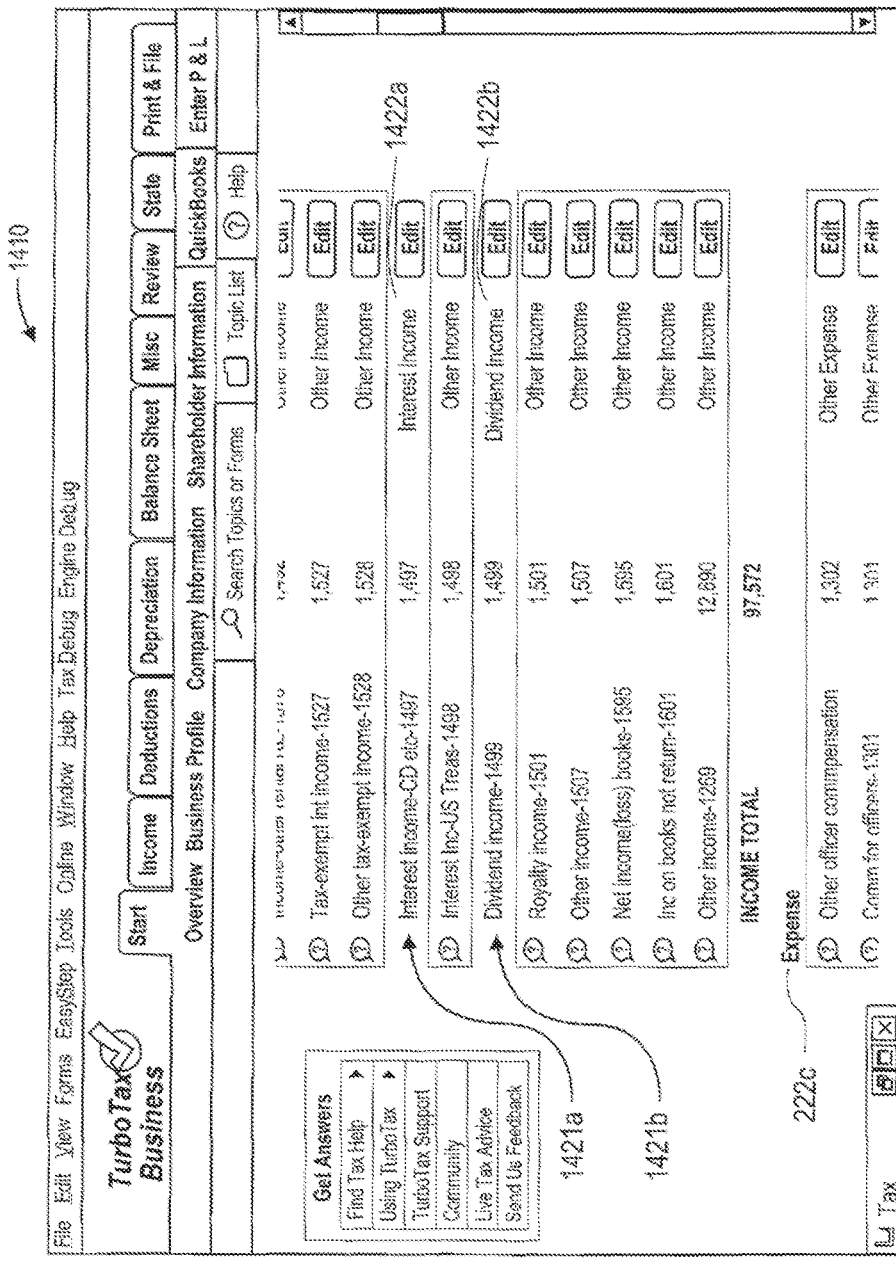
Figure 14D:
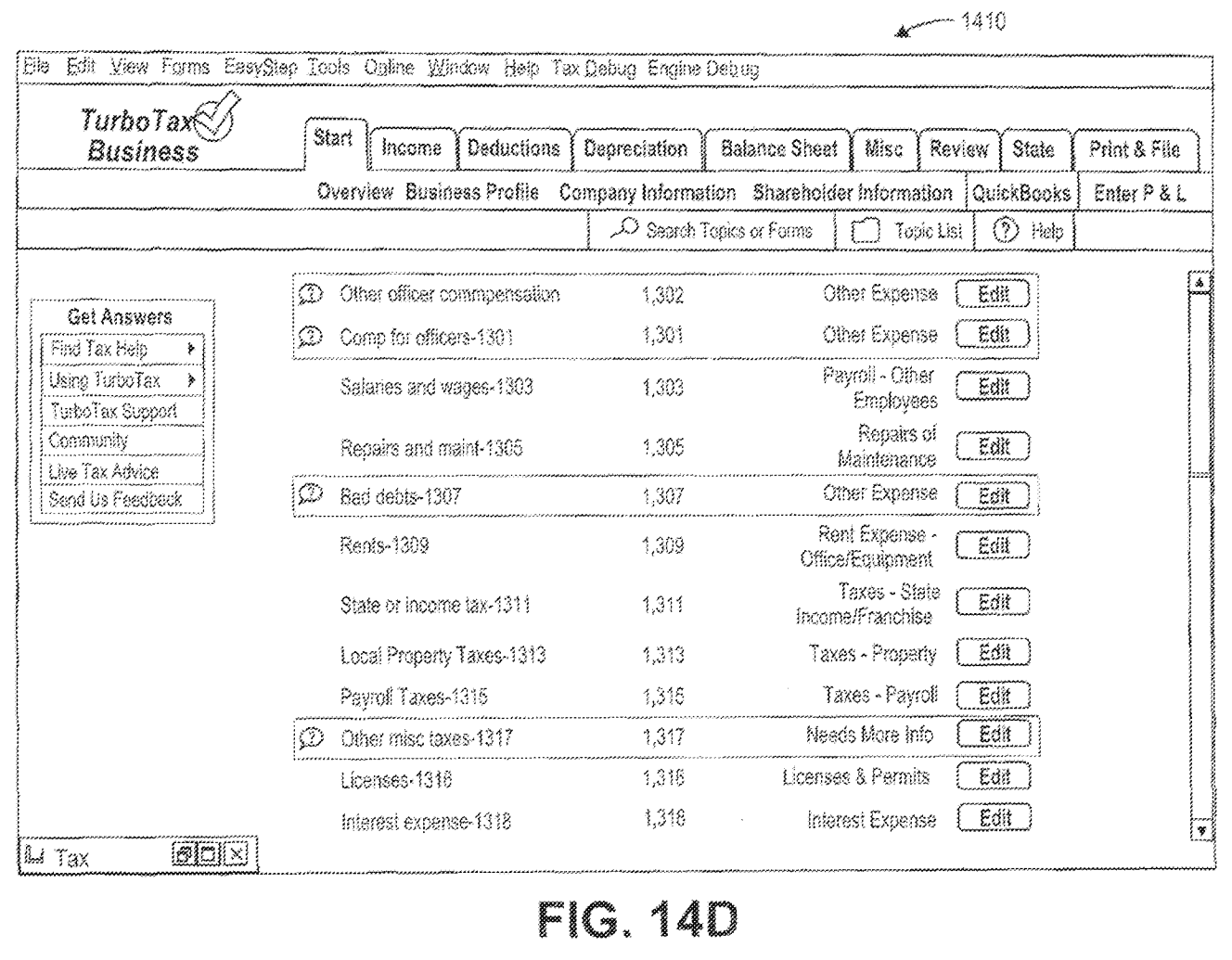
Figure 14E:
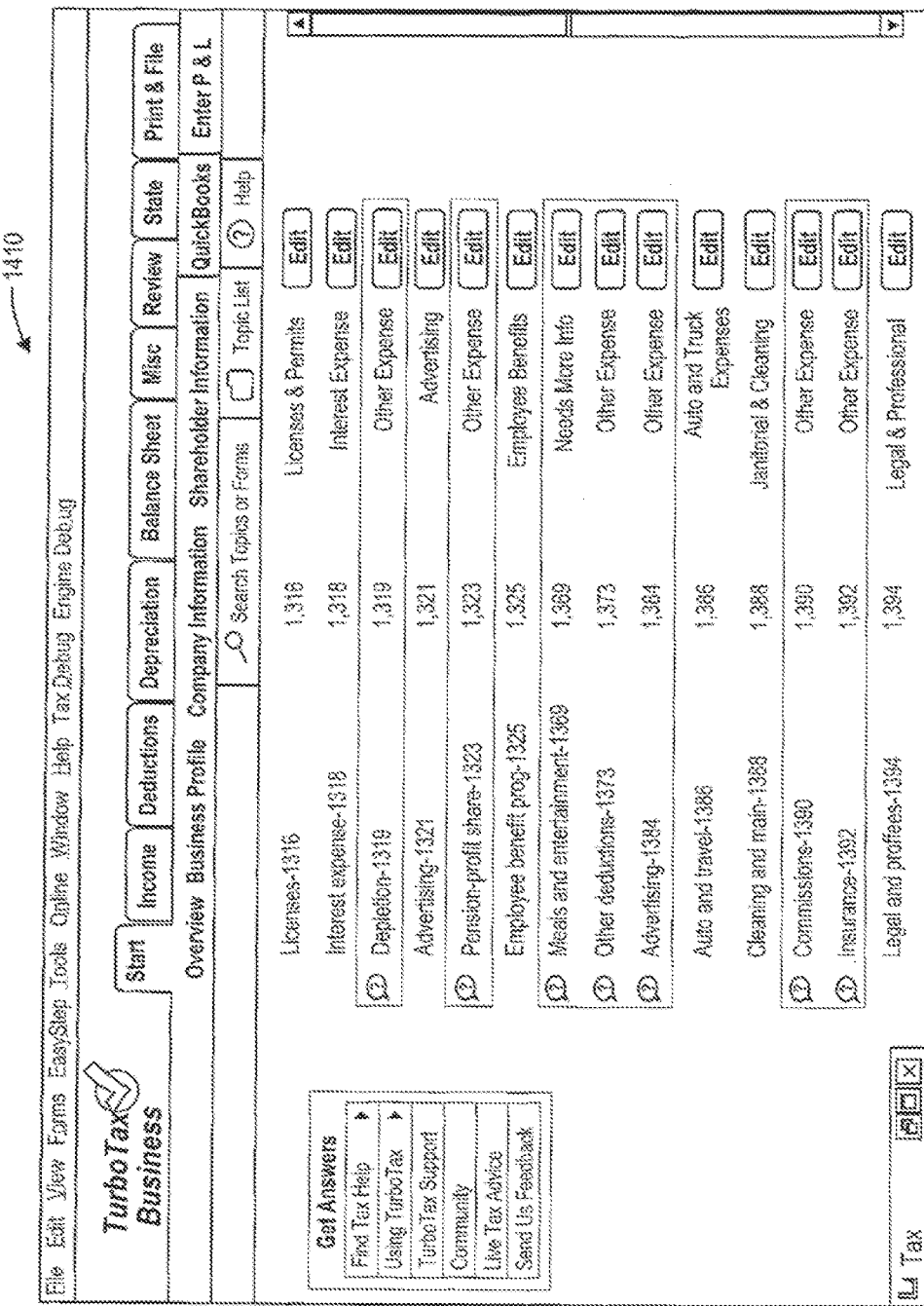
Figure 14F:

As shown in FIGS. 14B-C, two accounts 1421a, 1421b had account names 222a that matched a search term 522 in the spreadsheet 520 such that corresponding TLAs 300 were automatically assigned to the respective accounts 220. For example, the account 1421a named "Interest Income-CD etc-1497" was categorized 1422a using embodiments as "Interest Income" and with reference to the example spreadsheet shown in FIG. 9, this account 220 is assigned TLA 1007 for a C corporation, TLA 1497 for a S corporation, and TLA 1809 for a limited liability partnership. The account 1422a named "Dividend Income-1499" was categorized with embodiments as "Dividend Income" and, this account 1422a was assigned TLA 1037 for a C corporation, TLA 1499 for an S corporation, and TLA 1811 for a limited liability partnership. The other 14 income accounts were categorized as "Other Income" i.e., they were not categorized to a specific tax category, in which case the method illustrated in FIG. 13 may be executed to manually assign a tax category 250, select a tax category 250, manually assign a TLA 300 and/or provide additional information as appropriate.

FIGS. 14C-F illustrate the results of application of embodiments with respect to "expense" and "COGS" accounts 220. In the illustrated example, 15 of 32 expense accounts 220 were categorized to a specific tax category 250 such that a TLA 300 was automatically assigned to these accounts 220. The other 17 accounts were categorized as "Other Expenses" or "Needs More Info", in which case the method illustrated in FIG. 13 may be executed to manually assign a TLA 300, select a tax category 250, and/or provide additional information as appropriate. Of the four COGS accounts 220 in the illustrated example, two accounts 200 were categorized to a specific tax category 250 such that a TLA 300 could be assigned to these accounts 220, and the other two accounts 220 were categorized as "Other" COGS, in which case the method illustrated in FIG. 13 may be executed to manually assign a tax category 250, select a tax category 250, manually assign a TLA 300 and/or provide additional information as appropriate.

Figure 14G:
Figure 14H:
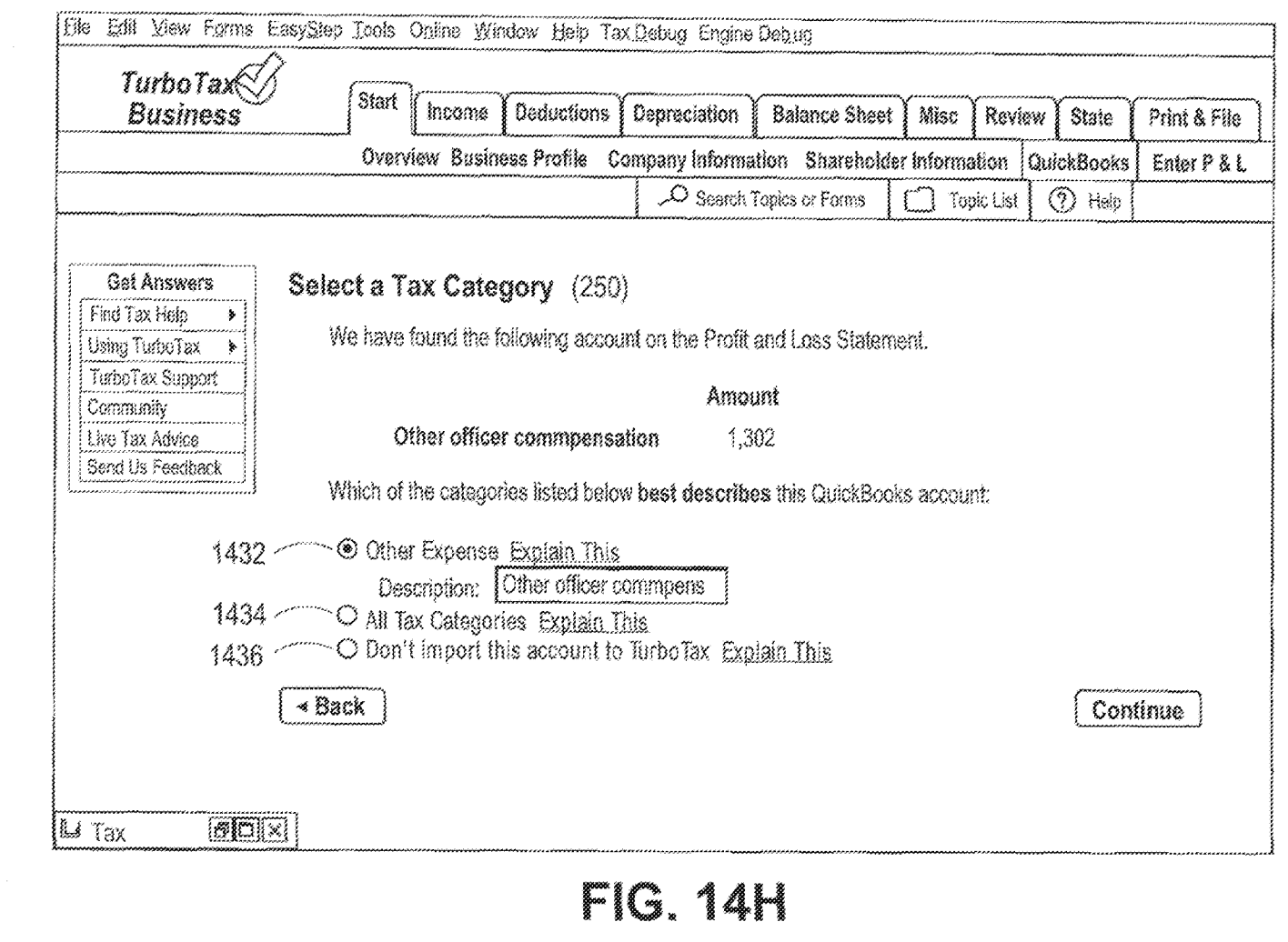
Figure 14I:
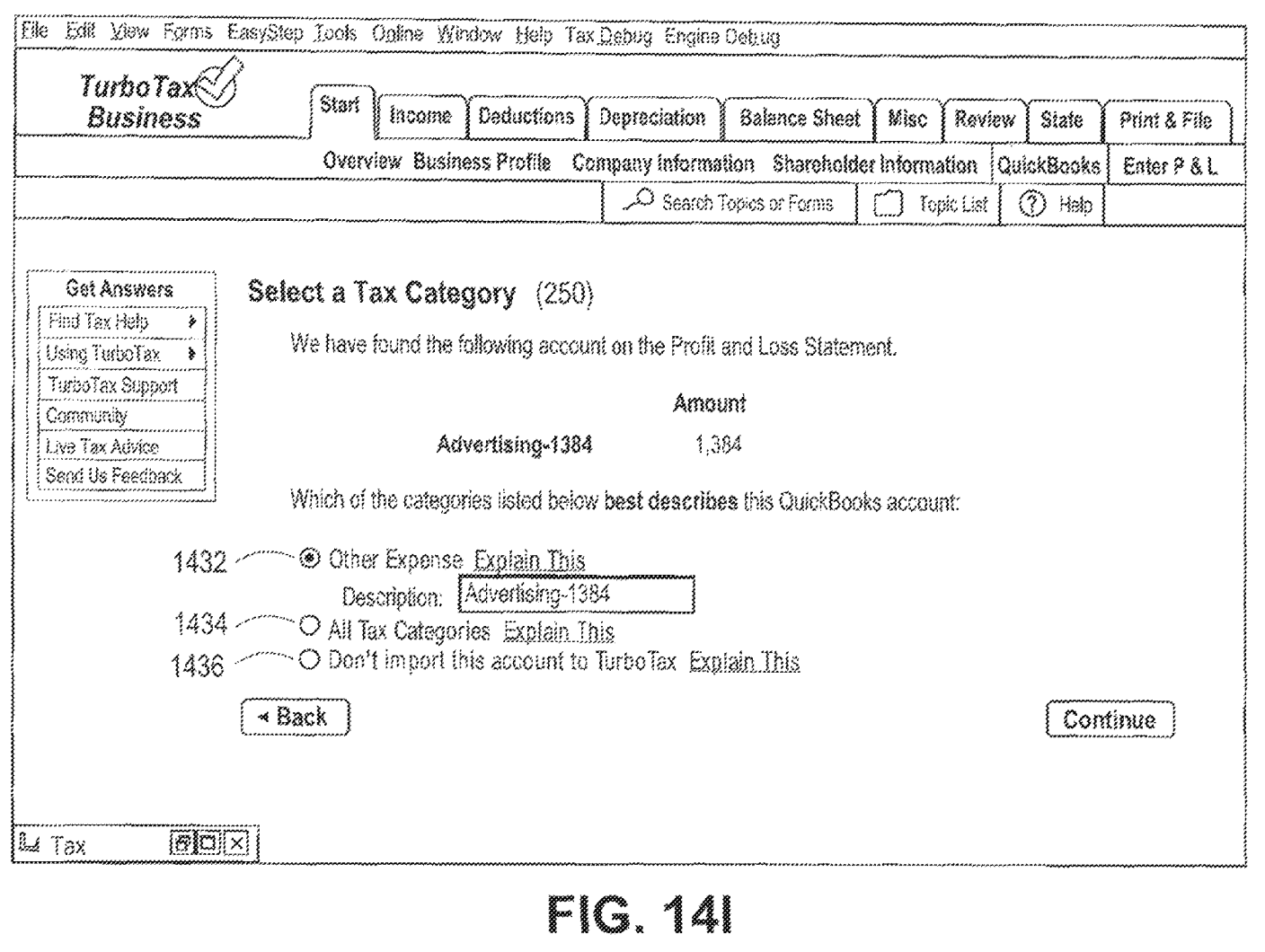

For example, FIGS. 14G-I illustrate an example of a screen or summary 1430 that may be utilized to select that an "other" tax category 250 should be selected 1432, to allow a user to provide additional information 1433 regarding this "other" tax category 250, to select a tax category 250 from a list of tax categories 1434, e.g., "All Tax Categories" as shown in FIGS. 14G-I, or to indicate that an account 220 should not be imported into the tax preparation application 1436. A similar interface or screen 1430 may also be utilized for "other" COGS accounts and COGS accounts that may need additional information. As previously discussed, account types 222c in the spreadsheet 520 may be utilized to filter the list of potential tax category 250 matches such that the user is presented with tax categories 250 that are most likely a match. For example, in one embodiment, a user is not presented with a list that includes expense tax categories if it is known that the account is an income account.

Figure 14J:
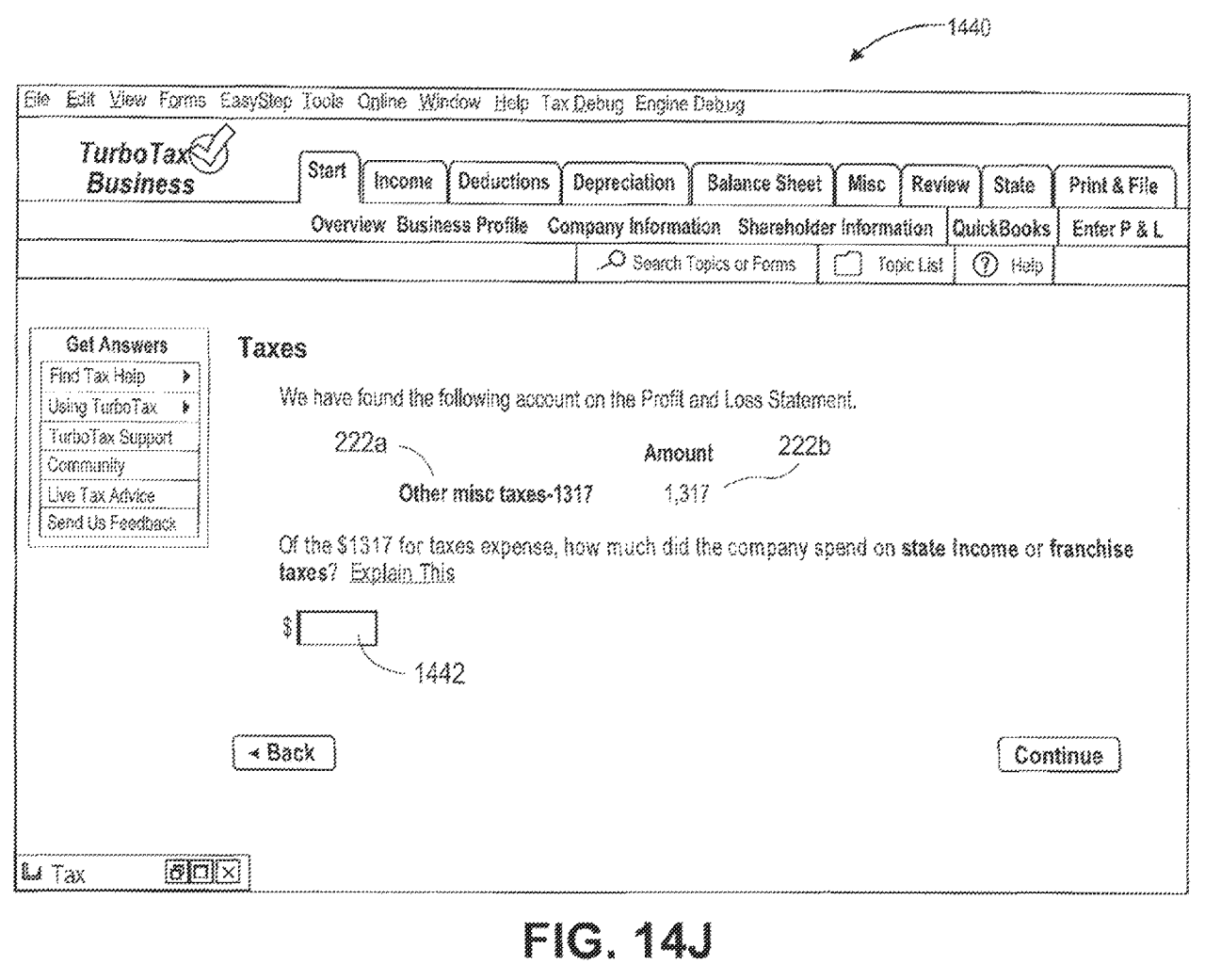
Figure 14K:
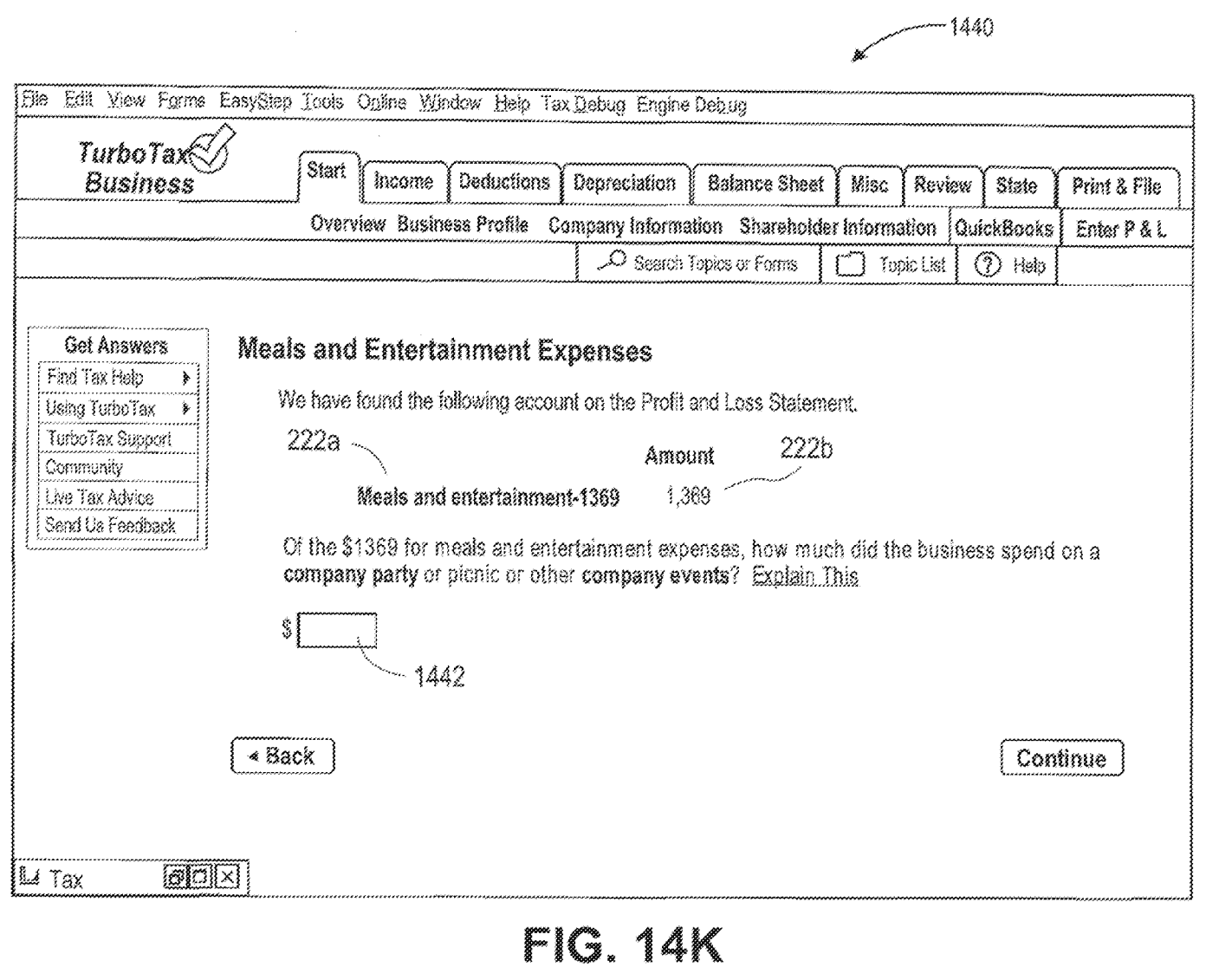

Referring to FIGS. 14J-K, a screen or summary 1440 may also allow a user drill down on a particular account 220 and further specify aspects of the account and enter additional information. FIG. 14J illustrates an account named 222a "Other misc taxes" that "needs more info" (FIG. 14D) and the user interface screen 1440 is configured to allow the user to enter in field 1442 how much of the $1317 of "other misc taxes" was spent on state income or franchise taxes such that the taxes paid can be properly allocated for tax calculations. FIG. 14K illustrates a screen or summary 1440 for an expense account named 222a "Meals and entertainment" that also "needs more info". In this example, the user can enter in field 1442 how much of the $1,369 for meals and entertainment can be allocated to a company party or other company events in order to determine which portion of this expense is tax deductible, e.g., to determine whether such expenses are not deductible, only 50% deductible or 100% deductible.

Figure 14L:
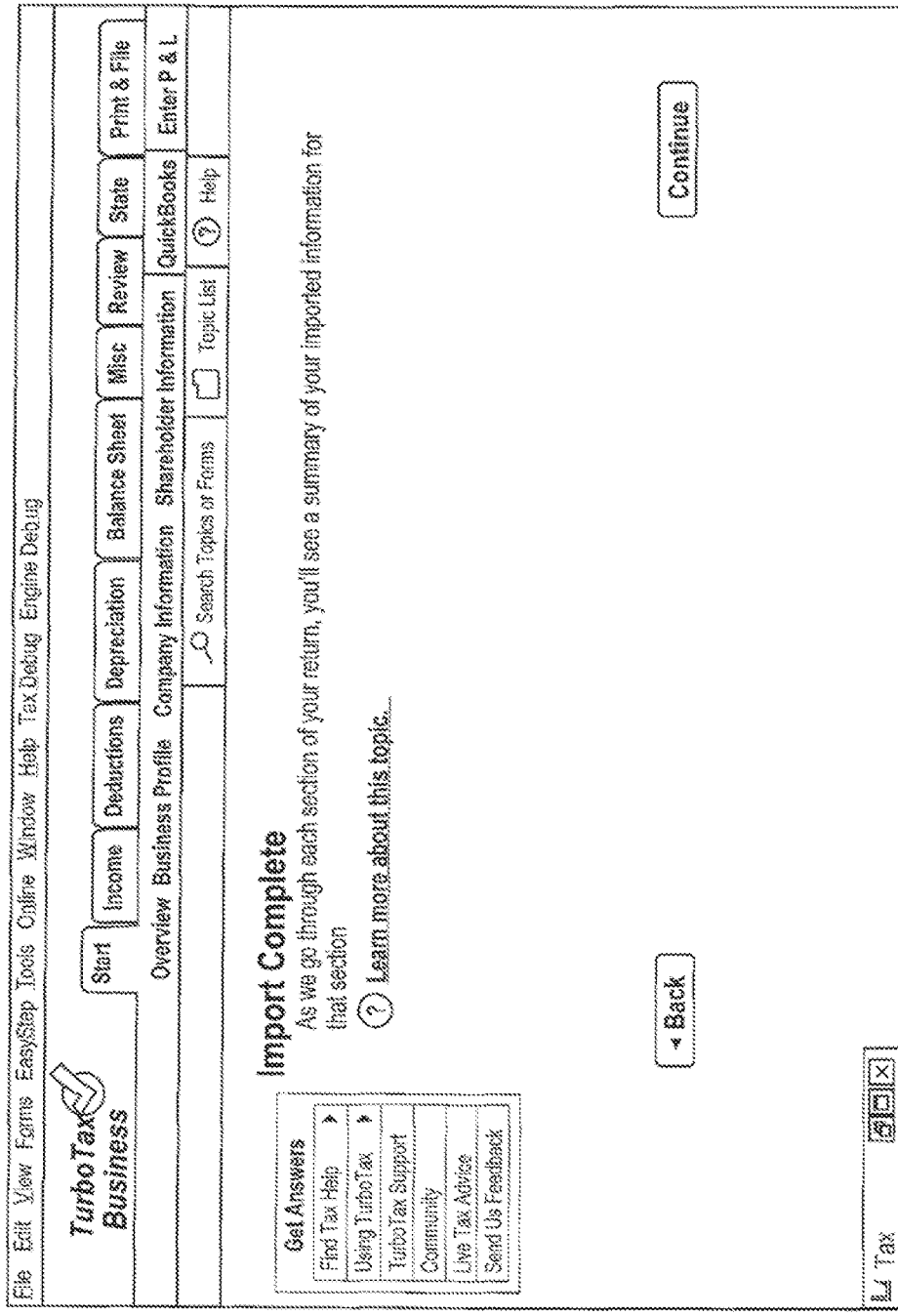

Referring to FIG. 14L, after user inputs are completed, a screen or summary 1450 may be presented to notify the user that importing of the pertinent account data 222 has been completed after embodiments have been executed.

In view of the description above, it should be understood that embodiments may be implemented using software, hardware or a combination thereof. Further, embodiments may execute on a computer, client or server that can be structured as generally illustrated in FIG. 17. The computer may, for example, be or utilize a personal computer system, a desktop computer, a laptop or notebook computer, a mainframe computer system, a handheld computer, a workstation, a network computer.

Figure 15:
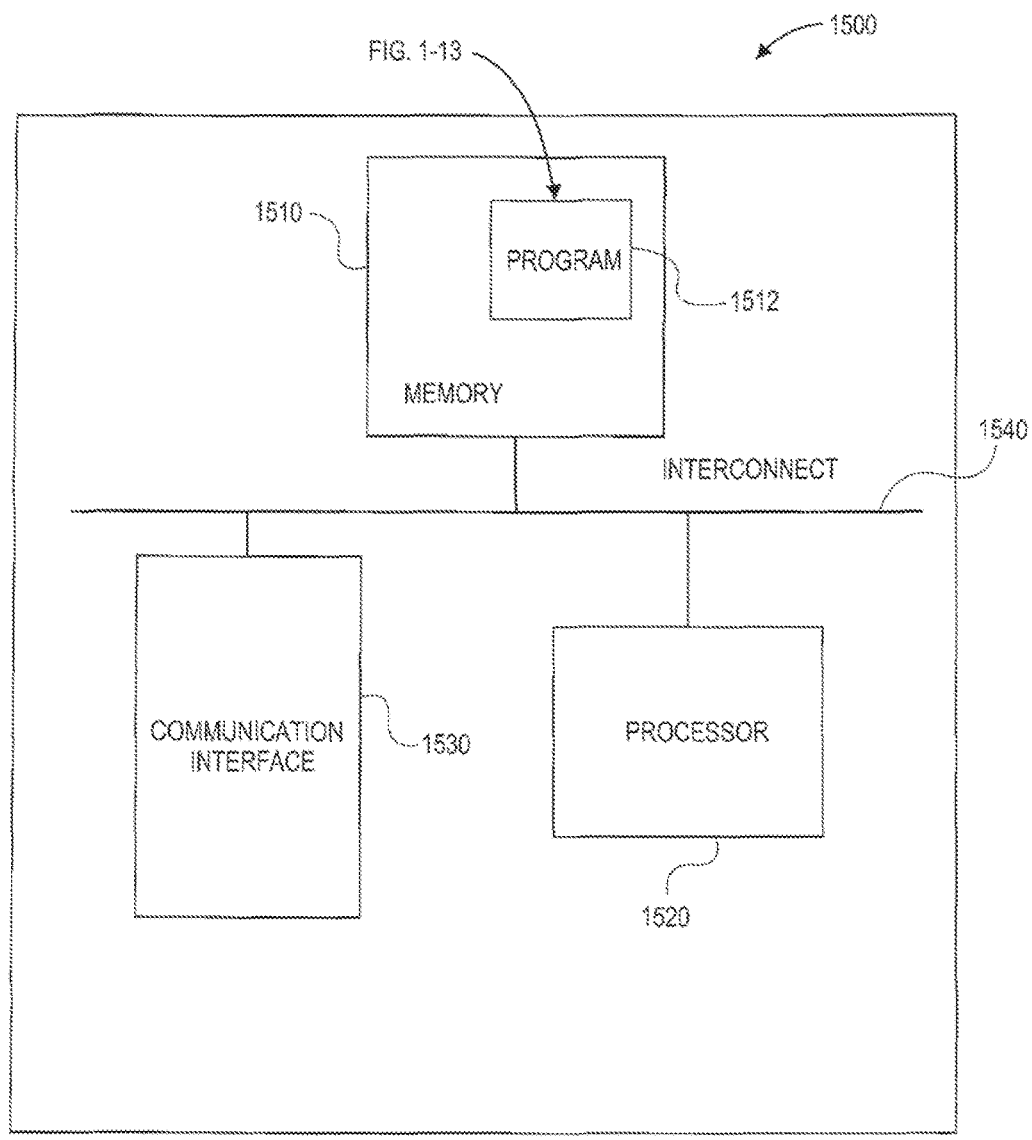
FIG. 15 is a system diagram of a computing apparatus in which embodiments may be implemented and that may be utilized to execute various embodiments.

FIG. 15 generally illustrates a typical computing device 1500 that may be utilized to execute embodiments and that includes a memory 1510, program instructions 1512, a processor or controller 1520, a network or communications interface 1530, and connections or interconnect 1540 between such components. For example, the memory 1510 may be or include one or more of cache, RAM, ROM, SRAM, DRAM, RDRAM, EEPROM and other types of memory. The accounting application 210 and the tax preparation application 230 may be stored in the memory 1510, and method embodiments of the invention may also reside in memory 1510, e.g. as program instructions 1512, which are executable to implement embodiments as illustrated in FIGS. 1-14L. According to one embodiment, embodiments in the form of program instructions 1512 are part of the tax preparation application 230, and the accounting application 210 and the tax preparation application 212 can be executed by a processor unit 1520. The processor unit 1520 may be or include multiple processors, a single threaded processor, a multi-threaded processor, a multi-core processor, or other type of processor. Depending on the particular system component (e.g., whether the component is a computer or a hand held mobile communications device), the interconnect 1540 may include a system bus, LDT, PCI, ISA, or other types of buses, and the communications or network interface may, for example, be an Ethernet interface, a Frame Relay interface, or other interface. The network interface 1530 may be configured to enable a system component to communicate with other system components across a network which may be a wireless or various other networks, e.g., to utilize an on-line version of the accounting application 210 and/or the tax preparation application 230. Accordingly, the system configuration provided in FIG. 15 is provided to generally illustrate how embodiments may be configured and implemented.

Method embodiments may also be embodied in, or readable from, a computer-readable medium or carrier, e.g., one or more of the fixed and/or removable data storage data devices and/or data communications devices connected to a computer. Carriers may be, for example, magnetic storage medium, optical storage medium and magnetooptical storage medium. Examples of carriers include, but are not limited to, a floppy diskette, a memory stick or a flash drive, CD-R, CD-RW, CD-ROM, DVD-R, and DVD-RW. The processor 1520 performs steps or executes program instructions 1512 within memory 1510 and/or embodied on the carrier to implement method embodiments.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

For example, embodiments may be implemented as software that is part of the tax preparation application. Embodiments may also be implemented by software that is separate from the tax preparation application and that resides in another application or location, e.g., within memory of a computer or as part of the accounting application. Embodiments may also be implemented in hardware or a combination of software and hardware.

Further, embodiments may be implemented on a single computer, i.e., the accounting application and tax preparation application reside on the same computer. In other embodiments, one of these applications may reside on a remote server and be accessed via a network, e.g., using a web browser that executes on a client computer. In other embodiments, embodiments may be implemented using on-line versions of both the accounting and tax preparation applications, and software for executing embodiments can reside on or multiple computers. Accordingly, it should be understood that embodiments can be implemented in other ways using different numbers of computers that may be local or remote, and using local or on-line accounting and tax preparation applications. Thus, embodiments can be implemented in different system configurations.

Additionally, although embodiments are described with reference to QuickBooks® as an example accounting application and TurboTax® for Business as an example of a tax preparation application, embodiments can be utilized with other accounting applications and tax preparation applications. For example, embodiments can be implemented using QuickBooks® and TurboTax®, other accounting or finance applications, other tax preparation applications, and other combinations of accounting and tax preparation applications.

Embodiments are described with reference to accounts that may be income, expense and COGS accounts, but embodiments may also be implemented using other types of accounts. Further, a lookup table or spreadsheet may include various numbers of search terms and TLAs and may include different numbers of rows and columns.

Moreover, it should be understood that screen shots of the user interface provided in FIGS. 14A-L are provided as examples of an interface that can permit a user to enter data. Other user interfaces may also be utilized.

Further, while multiple embodiments and variations of the many aspects of the invention have been disclosed and described herein, such disclosure is provided for purposes of illustration only. For example, where methods and steps described above indicate certain events occurring in certain order, those of ordinary skill in the art having the benefit of this disclosure would recognize that the ordering of certain steps may be modified and that such modifications are in accordance with the variations of the invention. Additionally, certain of the steps may be performed concurrently in a parallel process when possible, as well as performed sequentially.

Accordingly, embodiments are intended to exemplify alternatives, modifications, and equivalents that may fall within the scope of the claims.

What is claimed is:

1. A computer-implemented method for automatically preparing at least a portion of an electronic tax return, the method, comprising:
    a computer, by programmed instructions of a computerized tax return preparation application stored in a data store and executed by a processor of the computer, receiving data of an account of a computerized accounting application that is not utilized to prepare or file an electronic tax return, the account data comprising:
    an account name, and
    an account value associated with the account name and at least one transaction;
    the computer, by the computerized tax return preparation application, accessing a computer-generated spreadsheet comprising a plurality of rows including respective account name search terms and a plurality of columns including a first column having one or more search terms, a second column having one or more tax categories, and a third column having one or more references to a line of a tax form of the tax preparation application, and searching the computerized spreadsheet;
    the computer, by the computerized tax return preparation application, identifying a search term in the computerized spreadsheet matching the received account name;
    the computer, by the computerized tax return preparation application, determining a tax category corresponding to the received account name based at least in part upon the identified search term in the computerized spreadsheet;
    the computer, by the computerized tax return preparation application, automatically assigning a line of an electronic form of the electronic tax return to the account based at least in part upon the determined tax category, wherein the assigned line of the electronic form prepared by the tax return preparation application is to be populated with the account value; and the computer, by the computerized tax return preparation application, populating at least a portion of the electronic tax return by populating the assigned line of the electronic form with the account value.

2. The method of claim 1, further comprising the computer, by the computerized tax return preparation application:
   determining whether a line of the electronic form has already been assigned to the account; and
   determining the tax category when a line of the electronic form has not been assigned to the account.

3. The method of claim 1, the computer, by the computerized tax return preparation application, determining that a plurality of tax categories correspond to the account name, the method further comprising the computer, by the computerized tax return preparation application, presenting an interview screen through a display of the computer requesting user input to manually select one tax category as corresponding to the account name.

4. The method of claim 1, the line of the form being indirectly assigned by the tax return preparation application to the account through a tax line assignment comprising a pointer to the line of the form, wherein the tax category is associated with the tax line assignment.

5. The method of claim 1, further comprising the computer, by the computerized tax return preparation application, determining whether the line of the form was correctly assigned to the account based at least in part upon on feedback from a user of the tax preparation application.

6. The method of claim 1, the tax category being determined when the line of the form was previously assigned to the account but not yet categorized to a specific tax category.

7. The method of claim 1, further comprising the computer, by the computerized tax return preparation application:
   completing the electronic tax return; and
   electronically filing the electronic tax return with a tax authority through a network.

8. The method of claim 1, the computer hosting the computerized accounting application.

9. The method of claim 1, the account name received by the tax return preparation application describing a purchased item.

10. The method of claim 1, the account name comprising a name or identifier of another business with which the business entity was involved in the at least one transaction.

11. The method of claim 1, wherein the account name is a name of a type of income of the business entity, a type of expense of the business entity, or a type of cost of goods sold of the business entity.

12. The method of claim 1, wherein the account name is selected by the business entity.

13. The method of claim 1, wherein the account name is a name or identifier other than the business entity name or identifier.

14. The method of claim 1, wherein the computer, by the computerized tax return preparation application, determines that multiple tax categories correspond to the account name, the method further comprising the computer, by the computerized tax return preparation application, generating an interview screen to prompt a user of the tax preparation application to select one tax category of the multiple tax categories.

15. The method of claim 1, the account data received by the tax return preparation application further comprising an account type.

16. The method of claim 15, the account type being selected from the group consisting of expense, income and cost of goods sold.

17. The method of claim 1, wherein the account data is generated by the accounting application.

18. The method of claim 1, prior to determining the tax category, the method further comprising the computer, by the computerized tax return preparation application, determining whether the account name has been previously assigned to the line of the electronic form of the tax return preparation application, wherein the tax category corresponding to the account name is automatically determined when a line of a form of the tax preparation application has not been assigned to the account, or a line of a form of the tax return preparation application was previously assigned to the account but is not yet categorized to a specific tax category.

19. The method of claim 1, wherein multiple tax categories are determined by the tax return preparation application to correspond to the account name, the method further comprising the computer, by the computerized tax return preparation application, requesting user input to manually select one tax category as corresponding to the account name through an interview screen presented through a display of the computer.

20. The method of claim 1, wherein a tax line assignment associated with a line of a tax form is assigned to the account name based at least in part upon the determined tax category.

21. The method of claim 1, further comprising the computer, by the computerized tax return preparation application, determining whether the line of the electronic form of the tax return preparation application was correctly assigned to the account name based at least in part upon on feedback from a user of the tax return preparation application.

22. The method of claim 1, wherein the tax category corresponding to the account name is determined based at least in part upon the account name matching at least one search term in the first column, and the determined tax category in the second column is mapped to a corresponding reference to the line of the tax form in the third column.

23. The method of claim 1, wherein the first column comprises search terms that are related to or synonymous with the account name.

24. The method of claim 1, wherein the account name comprises one term, and the tax category corresponding to the account name is automatically determined based at least in part upon the one term exactly matching a single search term.

25. The method of claim 1, wherein the account name comprises at least two terms, and the tax category corresponding to the account name is based at least in part upon the at least two terms exactly matching at least two search terms.

26. The method of claim 1, wherein the account name comprises at least two terms that do not exactly match at least two search terms, the method further comprising the tax return preparation application determining whether the last term of the at least two terms of the account name exactly matches at least one search term.

27. The method of claim 1, wherein the account name comprises at least two terms that do not exactly match at least two search terms, the method further comprising the computer, by the computerized tax return preparation application:
   parsing the at least two terms; and
   determining whether a parsed term exactly matches at least one search term.

28. The method of claim 1, wherein the account name comprises at least two terms and a joinder element or symbol, further comprising the computer, by the computerized tax return preparation application, searching the computer-generated able or spreadsheet while ignoring the joinder element or symbol.

29. An article of manufacture comprising a computer program carrier readable comprising non-transitory computer readable media embodying one or more programmed instructions of a computerized tax return preparation application executable by a computer to perform a process for automatically preparing at least a portion of an electronic tax return, the process comprising:

the computer, by programmed instructions of the computerized tax return preparation application stored in a data store and executed by a processor of the computer, receiving data of an account of a computerized accounting application that is not utilized to prepare or file an electronic tax return, the account data comprising:

an account name, and an account value associated with the account name and at least one transaction;

the computer, by the computerized tax return preparation application, accessing a computerized-generated spreadsheet comprising a plurality of rows including respective account name search terms and a plurality of columns including a first column having one or more search terms, a second column having one or more tax categories, and a third column having one or more references to a line of a tax form of the tax preparation application, and searching the computerized spreadsheet;

the computer, by the computerized tax return preparation application, identifying a search term in the computerized spreadsheet matching the received account name;

the computer, by the computerized tax return preparation application, determining a tax category corresponding to the received account name based at least in part upon the identified search term in the computerized spreadsheet;

the computer, by the computerized tax return preparation application, automatically assigning a line of an electronic form of the electronic tax return to the account based at least in part upon the determined tax category, wherein the assigned line of the electronic from prepared by the tax return preparation application is to be populated with the account value; and the computer, by the computerized tax return preparation application, populating at least a portion of the electronic tax return by populating the assigned line of the electronic form with the account value.

30. The article of manufacture of claim 29 embodying one or more instructions for completing the electronic tax return utilizing the tax return preparation application, and filing the completed electronic tax return with a tax authority computer through a network.

31. The method of claim 1, wherein the computer generated spreadsheet format is a comma separated value (CSV) file format.

* * * * *